(12) United States Patent
Berkowitz et al.

(10) Patent No.: US 9,346,684 B2
(45) Date of Patent: May 24, 2016

(54) METHODS AND APPARATUSES FOR DECREASING THE CO2 CONCENTRATION OF A FLUID

(75) Inventors: Brian Berkowitz, Mazkeret Batya (IL); Ishai Dror, Shoham (IL); Robert Katz, Rehovot (IL)

(73) Assignee: YEDA RESEARCH AND DEVELOPMENT CO., LTD., Rehovot (IL)

( * ) Notice: Subject to any disclaimer, the term of this patent is extended or adjusted under 35 U.S.C. 154(b) by 1131 days.

(21) Appl. No.: 12/377,758

(22) PCT Filed: Aug. 21, 2007

(86) PCT No.: PCT/IL2007/001039
§ 371 (c)(1),
(2), (4) Date: Jun. 21, 2010

(87) PCT Pub. No.: WO2008/026201
PCT Pub. Date: Mar. 6, 2008

(65) Prior Publication Data
US 2010/0258506 A1    Oct. 14, 2010

Related U.S. Application Data

(60) Provisional application No. 60/840,708, filed on Aug. 29, 2006.

(51) Int. Cl.
| C01F 11/18 | (2006.01) |
| C01B 31/24 | (2006.01) |
| B01D 53/62 | (2006.01) |

(52) U.S. Cl.
CPC .............. *C01F 11/181* (2013.01); *B01D 53/62* (2013.01); *C01B 31/24* (2013.01); *B01D 2251/404* (2013.01); *B01D 2252/1035* (2013.01); *B01D 2257/504* (2013.01); *B01D 2258/06* (2013.01); *Y02C 10/04* (2013.01); *Y02P 20/152* (2015.11)

(58) Field of Classification Search
CPC .......................... C01F 11/18; B01D 2257/504
See application file for complete search history.

(56) References Cited

U.S. PATENT DOCUMENTS

| 4,210,626 A | 7/1980 | Berrie |
| 6,110,429 A | 8/2000 | Johansing, Jr. |
| 6,132,696 A * | 10/2000 | Porter et al. ................. 423/414 |
| 6,749,825 B2 * | 6/2004 | Fryxell et al. ............. 423/419.1 |
| 7,655,193 B1 | 2/2010 | Rau et al. |
| 8,987,149 B2 * | 3/2015 | Ahluwalia ..................... 442/143 |
| 2004/0219090 A1 | 11/2004 | Dziedzic et al. |
| 2004/0265199 A1 | 12/2004 | MacKnight et al. |
| 2005/0002847 A1 | 1/2005 | Maroto-Valer et al. |
| 2005/0145568 A1 | 7/2005 | Mc Ginnis |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0230293 A1 | 9/2010 | Gilliam et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2011/0135551 A1 | 6/2011 | House et al. |

FOREIGN PATENT DOCUMENTS

| CN | 1085188 A | 4/1994 |
| EP | 1733782 | 12/2006 |
| SU | 1361107 A1 | 12/1987 |
| SU | 1717541 A1 | 3/1992 |
| WO | WO 00/10691 | 3/2000 |

(Continued)

OTHER PUBLICATIONS

Jibril et al., 'Chemical Conversions of salt Concentrates from Desalination Plants' in Desalination vol. 139 pp. 287-295 (2001) no month.*
International Search Report for International Application Serial No. PCT/IL2007/001039, Mailed Feb. 10, 2008.
Chou, M., Manufacture of Ammonium Sulfate Fertilizer From Gypsum-Rich Byproduct of Flue Gas Desulfurization pp. 580-586.
Dror, I. & Berkowitz, B. (2004), Effects of Air Injection on Flow Through Porous Media: Observation and Analyses of Laboratory-Scale Processes. Water Resources Research, vol. 40, WO9203, 1-18.
Gunter, W. D., Perkins, E. H. and McCann, T. J., (1993) Aquifer Disposal of C02 Rich Gases: Reaction Design for Added Capacity. Energy Conversion and Management, 34, 941-948.

(Continued)

*Primary Examiner* — Stuart Hendrickson
(74) *Attorney, Agent, or Firm* — Mark S. Cohen; Pearl Cohen Zedek Latzer Baratz LLP

(57) ABSTRACT

This invention is directed to decreasing the CO2 concentration. The invention makes use of fluids and apparatuses for diminishing CO2 concentrations of fluids.

37 Claims, 4 Drawing Sheets

(56) References Cited

FOREIGN PATENT DOCUMENTS

| WO | WO 03/068685 | 8/2003 |
|---|---|---|
| WO | WO2005108297 | 11/2005 |

OTHER PUBLICATIONS

Kojima, T., Nagamine, A., Ueno N. and Uemiya, S., (1997) Absorption and Fixation of Carbon Dioxide by Rock Weathering/ Proceedings of the Third International Conference on Carbon Dioxide Removal, Cambridge Massachusetts, Sep. 9-11, 1996, Energy and Conservation Management, 38 Suppl, S461-S466.

Kroening, D. E., D. S. Snipes, S. E. Brame, R. A. Hodges, V. Price, and T. J. Temples (1996), The Rehabilitation of Monitoring Wells Clogged by Calcite Precipitation and Drilling Mud, Ground Water Monit. Rev., 16(2), 114-123.

Lackner, K. S. Wendt,C. H. Butt, D. P. Sharp D. H., and Joyce, E. L. (1995) Carbon Dioxide Disposal in Carbonate Minerals, Energy (Oxford), 20 (11) 1153-1170.

Miller, R. R., and D. S. Roote (2001), In-Well Vapor Stripping, Technol. Overview Rep., TO-97-01, Ground-Water Rem. Technol. Anal. Cent., Pittsburgh, PA.

O'Connor,W. K. (1998) Investigations Into Carbon Dioxide Sequestration by Direct Mineral Carbonation. Presentation at Second Meeting of Mineral Sequestration Working Group, Nov. 3, Albany Research Center, Albany, Oregon.

Seifritz, W. (1990) C02 Disposal by Means of Silicates Nature, 345, 486, Nature Publishing Group, Switzerland.

Soong et al. "Experimental and simulation studies on mineral trapping of CO2 with brine" Energy Conversion and Management 45,1845-1859, (2004).

Soong et al. "$CO_2$ sequestration with brine solution and fly ashes" Energy Conversion and Management vol. 47, Issues 13-14, pp. 1676-1685, Aug. 2006.

European Search Report Application No. 07805499 Dated Feb. 23, 2012.

Abdel-Aal H K et. al., "Chemical Separation Process for Highly Saline Water. 1. Parametric Experimental Investigation", Industrial & Engineering Chemistry Research, American Chemical Society, (1996) 35:799-804.

European Search Report for Application No. 12184442.7-1218 Dated Oct. 19, 2012.

Dziedzic D et. al., "Feasibility Study of Using Brine for Carbon Dioxide Capture and Storage from Fixed Sources", Journal of the Air and Waste Management Association, Dec. 2006.

Dror I. et. al. "Effects of air injection on flow through porous media: observations and analyses of laboratory-scale processes" (2004), WRR, 40, w09203, doi:10.1029/2003wr002960.

Florida Department of Environmental Protection (2003), Remedial action plan and system design checklist, Tallahasee, July.

Gunter, W. D. et. al., "Aquifer disposal of CO2 rich gases: Reaction Design for Added Capacity." Energy Conversion and Management, (1993) 34:941-948.

Kojima, T. et. al., "Absorption and fixation of carbon dioxide by rock weathering." Proceedings of the Third International Conference on Carbon Dioxide Removal, Cambridge Massachusetts, Sep. 9-11, 1996, Energy and Conservation Management, 38 Suppl, S461-S466 (1997).

Kroening, D. E. et. al., "The rehabilitation of monitoring wells clogged by calcite precipitation and drilling mud", Ground Water Monit. Rev., (1996), 16(2), 114-123.

Lackner, K. S. et. al., "Carbon dioxide disposal in carbonate minerals", Energy (Oxford), (1995), 20 (11) 1153-1170.

Miller, R. R. et. al., "In-well vapor stripping", Technol. Overview Rep., (2001), TO-97-01, Ground-Water Rem. Technol. Anal. Cent., Pittsburgh, Pa.

O'Connor et al.; "Carbon Dioxide Sequestration by Direct Mineral Carbonation: Results from Recent Studies and Current Status."

Seifritz, W. "CO2 Disposal by Means of Silicates" Nature, Jun. 7, 1990, 345: 486.

U.S. Environmental Protection Agency (1995), "How to evaluate alternative cleanup technologies for underground storage tank sites: A guide for corrective action plan reviewers", Reps. EPA 510-B-94-003, EPA 510-B-95-007, EPA 510-R-04-002, chap.

URS (2003), "Groundwater circulation well pilot test technical memorandum: Northwest Pipe and Casing operable unit 2 groundwater remedial design", Doc. Control No. 9300.54, U.S. Environ. Prot. Agency, Portland, Oreg., Jan.

Vision 21, (1998) "Clean Energy for the 21st Century", U.S. Department of Energy, Office of Fossil Energy DOE/FE-0381, November.

Socolow R. H., "Can we bury global warming" Scientific American, Jul. 2005, p. 49-55.

Lackner K. S., "A Guide to $CO_2$ Sequestration" Science, 2003, vol. 300:1677-1678.

Hileman et al.; "Driving CO2 Underground", C&E , Sep. 24, 2007, pp. 74-81.

Huijgen et al.; "Mineral CO2 Sequestration by Steel Slag Carbonation", Environ. Sci. Technol. 2005, 39, 9676-9682.

C&EN News of Mar. 3, 2008; "Real-Life Trial of $CO_2$ Capture", edited by William G. Schulz & Kenneth J. Moore, Mar. 3, 2008.

Dror et al.; "Effects of air injection on flow through porous media: Observations and analyses of laboratory-scale processes", Water Resources Research, vol. 40, W09203: 1-11.

* cited by examiner ously change the pH.

METHODS AND APPARATUSES FOR DECREASING THE CO2 CONCENTRATION OF A FLUID

CROSS-REFERENCE TO RELATED APPLICATIONS

This application is a National Phase Application of PCT International Application No. PCT/IL2007/001039, International Filing Date Aug. 21, 2007, claiming priority of U.S. Provisional Patent Application 60/840,708, filed Aug. 29, 2006, both of which are incorporated herein by reference in their entirety.

FIELD OF THE INVENTION

This invention is directed to decreasing $CO_2$ concentrations. The invention makes use of fluids and apparatuses for diminishing $CO_2$ concentrations of fluids.

BACKGROUND OF THE INVENTION

Climate changes significantly influence the planet geosphere. One of the major impacts on climate changes is the emission of various greenhouse gases to the atmosphere which amplify global warming. Most of the greenhouse gases emitted originate from human activity, mainly as a by-product of the burning of fossil fuels (e.g., coal, oil, gasoline, natural gas) with the major gas emitted being $CO_2$. Reduction of $CO_2$ emissions is necessary, until alternative energy sources are available, or until other inexpensive, clean, and plentiful technologies are available.

Fossil fuels appear to be the dominant energy source for this century, as no alternative energy supply is poised to significantly replace fossil fuel energy without other limitations. Moreover, global energy consumption is increasing significantly, concomitant with an increase in global standards of living, in many parts of the world. Developing an effective method for decreasing or stabilizing atmospheric $CO_2$ concentrations is critical in order to prevent, or at least mitigate massive global climate changes; improving the efficiency of energy production and utilization, and developing renewable energy sources, cannot fully address the problems caused by current (and future) greenhouse gas emissions.

An increase in atmospheric $CO_2$ will affect the planet's hydrosphere. In water, $CO_2$ is in a chemical equilibrium with bicarbonate ($HCO_3^-$) and carbonic acid ($H_2CO_3$) (equation 1). Changing the concentration of one of the components of this equilibrium will accordingly change the pH.

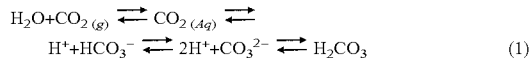
(1)

The pH and the $CO_2$ concentration also affect chemical processes in water and formation of minerals. For instance, when basic conditions prevail, equilibrium considerations favor precipitation of the bicarbonates and carbonic acid groups as carbonate minerals. On the other hand, acidic conditions release $CO_2$ by dissolution and dissociation of the carbonates.

It is clear that reduction of $CO_2$ emissions is necessary to avoid potentially harmful changes to the biosphere. $CO_2$ sequestering is a known method for reducing $CO_2$ emissions to the atmosphere. For example the Sleipner oil and gas field, located in the North Sea, is used to store compressed $CO_2$ which was pumped into a 200-meter-thick sandstone layer, about 1000 meters below the seabed. Approximately 1 million metric tons of $CO_2$ (equivalent to about 3% of Norway's total annual $CO_2$ emissions) have been sequestered annually at Sleipner.

The long-term efficiency of such sequestering remains a subject of intense study and debate. In particular, uncertainties in storage lifetimes (due to leakage), seismic instability, changes in layered structures due to pressure and/or chemical reactions with and/or initiated and/or catalyzed by the stored $CO_2$ and potential migration of buoyant $CO_2$, raise serious doubts as to the long-term integrity of such systems.

Mineral sequestering involves the reaction of $CO_2$ to form geologically stable carbonates, i.e. mineral carbonation. There have been several methods suggested to achieve carbonation, based largely on acid-base reactions between $CO_2$ and various kinds of silicates. An underground injection scheme, carried out at 105° C. and a pressure of 90 atm, $CO_2$ was used to test the validity of mineral-trapping of $CO_2$. This injection scheme failed due to sluggish kinetics of the reaction. It is believed, however, that injected $CO_2$ into aquifer material, and interaction over geological time scales, may achieve the desired result.

$CO_2$ trapping and storage is a difficult task and there are many remaining challenges. Mineral carbonation is a promising method as a number of advantages of reducing the concentration of $CO_2$ by mineral carbonation exist. One advantage is long-term stability of the formed carbonates, which are environmentally safe and stable materials over geological time frames. Another advantage is the vast availability of raw materials to sequester $CO_2$. Another advantage of mineral carbonation is its potential to be economically viable, since the overall process is exothermic. In addition, its potential to produce value-added by-products during the carbonation process may further compensate its costs. Another advantage of mineral carbonation process is also the large availability of sites at which sequestering can be practiced.

Thus, feasible means of $CO_2$ sequestering in order to sufficiently reduce the $CO_2$ concentration in the atmosphere and in water on a practically useful time-scale is currently lacking.

SUMMARY OF THE INVENTION

In one embodiment, this invention provides a method of decreasing a $CO_2$ concentration of a fluid, the method comprising applying a flow of a first gas comprising trace amounts or no $CO_2$ and applying a second gas comprising $CO_2$ at a concentration higher than that found in an air-water equilibrium to a fluid comprising:
a salt; and
a liquid;
whereby solid carbonate is formed in said fluid and the concentration of said $CO_2$ in said fluid is decreased.

In one embodiment, this invention provides a fluid comprising a pressurized first gas, comprising trace amounts or no $CO_2$, a second gas comprising $CO_2$ at a concentration of at least higher than that found in an air-water equilibrium and a salt.

In one embodiment, this invention provides a method of decreasing a $CO_2$ concentration of a fluid, comprising the steps of:
applying a flow of $CO_2$ to a liquid comprising a salt, forming carbonic acid in solution; and
mixing said carbonic acid solution in (i) with a base,
whereby the pH of said mixture in (ii) is between 9-12; and
solid carbonate is formed and the concentration of $CO_2$ in said fluid sample is decreased.

In one embodiment, this invention provides an apparatus for decreasing the concentration of $CO_2$ of a fluid, the apparatus comprising:
- a first conveyor for the introduction of a first gas comprising trace amounts or no $CO_2$;
- a second conveyor for the introduction of a second gas comprising $CO_2$ at a concentration of at least higher than that found in an air-water equilibrium; and
- a reaction chamber;
- whereby upon adding a solution comprising a salt to said reaction chamber, introducing said first gas into said reaction chamber via said first conveyor, and introducing said second gas into said reaction chamber via said second conveyor, solid carbonate formation in said reaction chamber and evolution of unreacted gas comprising a reduced concentration of $CO_2$ occurs.

In another embodiment, this invention provides a method of decreasing a $CO_2$ concentration of a fluid, wherein said method comprises applying said fluid to an apparatus of this invention.

In one embodiment, this invention provides an apparatus for decreasing the concentration of $CO_2$ in a fluid sample, the apparatus comprising:
- a first conveyor for the introduction a base;
- a second conveyor for the introduction of a fluid sample comprising $CO_2$;
- a reaction chamber; and
- whereby upon adding a solution comprising a salt to said reaction chamber, introducing said base into said reaction chamber via said first conveyor, and introducing said fluid sample into said reaction chamber via said second conveyor, that enables solid carbonate formation in said reaction chamber and evolution of unreacted gas occurs.

In another embodiment, this invention provides a method of decreasing a $CO_2$ concentration of a fluid sample, wherein said method comprises applying the fluid sample to the apparatus of this invention for decreasing the concentration of $CO_2$ of a fluid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
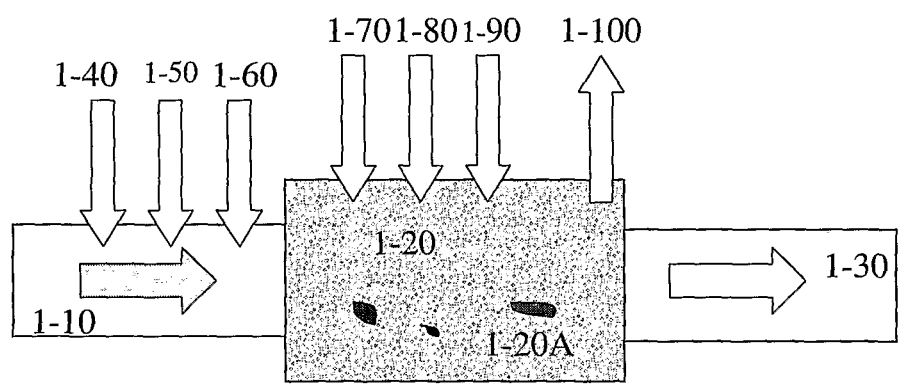
FIG. 1 Schematically depicts elements of an apparatus to effect one embodiment of a method of this invention. A conveyor (1-10) applies water from an external supply to the reaction chamber, which in this embodiment is a reservoir (1-20). Pressure or a pump is applied such that water is conveyed out of the chamber (1-30) and potentially recirculated. A concentrated $CO_2$-conducting gas is injected (1-40). Air, or air containing one or more additives to further raise/control the pH, or a base in the gas phase or a basic solution (1-90) in the chamber and solid carbonate precipitates (1-20A). The apparatus may comprise outlets for the release of air or $CO_2$ (1-100), which may also be recycled to the chamber via the inlet ports (1-40) and (1-90) respectively. Ducts and other similar types of equipment may be used to circulate the gases to desired locations. Optional ports may allow introduction (or additional introduction of) of mineral grains (or colloid) suspended in the water and/or any other solid matrix material (which act as nucleation materials to encourage carbonate precipitation) (1-50) and (1-70); and/or source of salts such as calcium or magnesium salts (1-60) and (1-80).

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention provides, in some embodiments, methods, fluids and apparatuses for decreasing an atmospheric $CO_2$ concentration. In some embodiments, such fluids, methods and apparatuses are useful in treating air surrounding any environment. In another embodiment such fluids methods and apparatuses are useful in treating air as a by-product of an industrial process prior to its release to the surrounding environment. As such, the methods, fluids and apparatuses for use according to this invention are environmentally friendly. In some embodiments, the atmospheric $CO_2$ is air from any region contaminated by high levels of $CO_2$. In some embodiments a flow of $CO_2$, together with additional flow of air are injected to a reservoir comprising an aqueous solution of metal ions, wherein said metal ions precipitate with the $CO_2$ forming a solid carbonate, thereby, reducing an atmospheric $CO_2$ concentration by forming a precipitate, a solid carbonate, and preventing escape of $CO_2$ to the atmosphere. In some embodiments a flow of $CO_2$ is injected to an aqueous solution comprising metal ions and a base is added to said aqueous solution, wherein said metal ions precipitate with the $CO_2$ forming a solid carbonate, thereby, reducing an atmospheric $CO_2$ concentration by forming a precipitate, a solid carbonate, and preventing escape of $CO_2$ to the atmosphere.

In some embodiments, this invention provides methods, fluids and apparatuses for decreasing a $CO_2$ concentration of a fluid. In some embodiments, the fluid is an aqueous solution. In some embodiments, this invention provides methods, fluids and apparatuses for decreasing a $CO_2$ concentration in an aqueous solution. In some embodiments a flow of $CO_2$ together with flow of air are injected to an aqueous solution comprising metal ions, forming a high concentration of $CO_2$ in the aqueous solution, wherein $CO_2$ forms a precipitate together with the metal ions, thereby reducing the concentration of $CO_2$ in an aqueous solution. In some embodiments a flow of $CO_2$ is injected to an aqueous solution comprising metal ions and a base is added to said aqueous solution, wherein said metal ions precipitate with the $CO_2$ forming a solid carbonate, thereby, reducing an atmospheric $CO_2$ concentration by forming a precipitate, a solid carbonate, and preventing escape of $CO_2$ to the atmosphere.

In some embodiments, the aqueous solution is from a natural resource. In another embodiment, this invention makes use of natural resources for the reduction of $CO_2$ concentrations. In another embodiment, natural resources are oceans, lakes, rivers, seas, reservoirs, groundwater, or brackish water, which is rich in Ca ions.

In another embodiment, the aqueous solution is an effluent from a desalination plant.

In one embodiment, such methods, fluids and apparatuses will find application in the treatment of air containing high levels of $CO_2$. In another embodiment $CO_2$ may be derived from the burning of waste, plastics, hydrocarbons, wood, fossil fuels, coal, brown coal, naphta, oil, gasoline, diesel fuels, kerosene, petroleum, liquefied petroleum gas (LPG), natural gas, bottled gas, methane, butane, propane, gasoline additives, ethanol, methanol, biodiesel, mono alkyl ester and/or any combination thereof.

In another embodiment, such methods, fluids and apparatuses will find application in the treatment of $CO_2$ produced as a by-product of a man-made process. In another embodiment, such methods, fluids and apparatuses will find application in reducing the green-house effect. In another embodiment, such methods, fluids and apparatuses will find application in reducing global warming. In another embodiment, such methods, fluids and apparatuses will find application in reduction of hydraulic conductivity, for example to prevent intrusion of saltwater or other contaminants.

In one embodiment, this invention provides a method of decreasing the concentration of any gas or liquid contaminant, by binding or storing the gas or liquid contaminants to a layer in earth, forming a less toxic product. In one embodiment, such a layer comprises ionic, and/or porous materials.

In one embodiment, gases whose treating may be affected by the methods, fluids and apparatuses of this invention may comprise a greenhouse gas such as comprising CO, $CO_2$, $NO_x$, $SO_x$, and/or methane (wherein x is an integer 1-2). In another embodiment, the concentration of atmospheric $SO_2$ or $SO_2$ dissolved in water can be decreased by forming solid sulfates, for example calcium sulfate or magnesium sulfate.

In one embodiment, this invention provides a method of decreasing a $CO_2$ concentration of a fluid, the method comprising applying a flow of a first gas comprising trace amounts or no $CO_2$ to a fluid comprising:
a second gas comprising $CO_2$ at a concentration of at least higher than that found in an air-water equilibrium;
a salt; and
a liquid;
whereby solid carbonate is formed in said fluid and the concentration of said $CO_2$ in said fluid is decreased.

In some embodiments, the methods, and apparatuses make use of fluids comprising a first gas, wherein said first gas is air, nitrogen, argon, oxygen, CO, $NO_x$, $SO_x$, methane or any combination thereof. In another embodiment, trace amount of $CO_2$ in said first gas refers to a range of 0-0.04% v/v of $CO_2$ in said first gas. In another embodiment, the first gas is derived from a chemical plant. In another embodiment, the first gas is derived from a commercial source. In another embodiment, the first gas is derived from the atmosphere.

In some embodiments, the methods and apparatuses make use of fluids comprising a second gas comprising $CO_2$ at a concentration of at least higher than that found in an air-water equilibrium, wherein the concentration of atmospheric $CO_2$ affecting an air-water equilibrium, currently, is around 350 ppm (0.035% v/v). In another embodiment, $CO_2$ concentration found in an air-water concentration is in the range of 200-1000 ppm, depending on the environmental conditions such as pH, salinity, temperature, and pressure.

In one embodiment, the methods and apparatuses make use of fluids comprising a second gas comprising $CO_2$ at a concentration of at least 0.1% v/v. In another embodiment the second gas comprises $CO_2$ at a concentration of at least 0.5% v/v. In another embodiment the second gas comprises $CO_2$ at a concentration of at least 1% v/v. In another embodiment the second gas comprises $CO_2$ at a concentration of at least 10% v/v. In another embodiment the second gas comprises $CO_2$ at a concentration of at least 20% v/v. In another embodiment the second gas comprises $CO_2$ at a concentration of at least 30% v/v. In another embodiment the second gas comprises $CO_2$ at a concentration of at least 50% v/v. In another embodiment, the second gas is a pure $CO_2$.

In one embodiment, the term "pure" refers to the second gas as mixture of $CO_2$, gas and/or liquid having a $CO_2$ range of between 90-100% v/v having a $CO_2$ concentration range of between 90-100% v/v. In another embodiment, the $CO_2$ concentration range is between about 95-100% v/v. In another embodiment, the $CO_2$ concentration range is between about 99-100% v/v. In another embodiment, the $CO_2$ concentration range is between about 70-100% v/v. In another embodiment, the term pure refers to $CO_2$ free of other gases. In one embodiment, the second gas used in the methods, apparatuses and fluids is within an aqueous solution.

In another embodiment, the aqueous solution is a super-saturated solution of $CO_2$.

In one embodiment, the first gas and the second gas used in the methods, apparatuses and fluids of this invention are injected to a fluid. According to this aspect, and in one embodiment, the first gas is injected at a flow rate efficient to diminish the $CO_2$ concentration in the fluid. In another embodiment, the first gas has a flow rate range of about 20:1 to 1:500 second gas to first gas ratio. In another embodiment, the first gas is injected at a flow rate range of about 2:1 to 1:200 second gas to first gas ratio. In another embodiment, the first gas is injected at a flow rate range of about 10:1 to 1:10,000 second gas to first gas ratio.

In another embodiment, the methods, fluid and apparatuses make use of a second gas, wherein said second gas is applied or introduced to a fluid or solution at a volumetric flow rate efficient to increase the concentration of $CO_2$ in the fluid or solution. In another embodiment, the volumetric flow rate depends on the size of the treated zone.

In one embodiment, the methods, fluid and apparatuses make use of a first gas wherein the second gas is applied, injected or introduced to a fluid or solution prior to the solubilization, introduction or injection of the second gas. In another embodiment, the methods, apparatus and fluid comprise or use a first gas which may be applied, injected or introduced to the fluid or solution subsequent to the solubilization, introduction or injection of the second gas. In another embodiment, the methods, apparatus and fluid comprise or use a first gas which may be applied, injected or introduced to the fluid or solution simultaneously with the solubilization, introduction or injection of the second gas.

In one embodiment, the methods, fluid and apparatuses make use of a first gas which removes or diminishes $CO_2$ in an aqueous solution and concurrently raises the pH of the solution. In another embodiment, the pH in said aqueous solution is between 9-12 in the region 1-100 m of the introduction of the first gas. In another embodiment, the pH in said aqueous solution is between 9-12 in the region 0.1-100 m of the introduction of the first gas. In another embodiment, the pH in said aqueous solution is between 9-12 in the region 50-100 m of the introduction of the first gas. In another embodiment, the pH in said aqueous solution is between 9-12 in the region 1-10 m of the introduction of the first gas. In another embodiment, the pH in said aqueous solution is between 9-12 in the region 0.1-1 m of the introduction of the first gas. In another embodiment, the pH in said aqueous solution is between 9-12, wherein the region of effectiveness depends on the flow rate of the first gas. In another embodiment, this process facilitates solid carbonate precipitation, whereby $CO_2$ of said second gas is bound as a carbonate. In one embodiment the solid carbonate precipitate is maintained in the fluid. In another embodiment, the solid carbonate precipitate is further isolated. In another embodiment, isolation of the precipitate is via filtration and/or centrifugation, or combination thereof. In another embodiment, the precipitate is recovered, or in another embodiment, recycled, or in another embodiment, regenerated, or reused.

In another embodiment, the methods, fluid and apparatuses make use of a second gas, wherein said second gas, is a consequence of a man-made process, a consequence of a natural process or a gas created as a by-product of a manmade process. In another embodiment, the methods, fluid and apparatuses make use of a second gas, wherein said second gas is released to the atmosphere, and conveyed to the fluid by ducts. In another embodiment, the methods, fluid and apparatuses make use of a second gas, wherein said second gas is conveyed from a factory exhaust system, wherein $CO_2$ is expelled, to the fluid by ducts, thereby preventing $CO_2$ release to of the atmosphere.

In some embodiments, the methods and apparatuses make use of fluids comprising a second gas comprising $CO_2$ at a concentration of at least higher than that found in an air-water equilibrium, wherein said second gas is a gas created as a by-product of a man-made process and is discharged to the atmospheric air, thereby forming contaminated air by $CO_2$.

In one embodiment, the methods, fluid and apparatuses make use of $CO_2$. In another embodiment, $CO_2$ is derived from the second gas comprising $CO_2$ at a concentration of at least higher than that found in an air-water equilibrium, for formation of solid carbonate. In another embodiment, $CO_2$ is derived from the first gas comprising trace amounts of $CO_2$, for formation of solid carbonate. In another embodiment, $CO_2$ is derived from the water, for formation of solid carbonate.

In one embodiment, the methods, fluid and apparatuses make use of a fluid or an aqueous solution wherein upon applying or introducing the first gas prior to or subsequent to the second gas, results in increase in the pH. In another embodiment the pH is a basic pH upon introduction of a first gas. In another embodiment the basic pH formed by introducing the first gas is in a range of 7-9. In another embodiment the basic pH, formed by introducing the first gas, is in a range of 7-8. In another embodiment the basic pH, formed by introducing the first gas, is in a range of 7-10. In one embodiment, the methods, apparatus and fluid comprise or use a fluid and/or an aqueous solution at basic pH.

In one embodiment, upon exposure of the second gas to the first gas, in the presence of a salt solution, solid carbonate is formed.

In one embodiment, this invention provides a method of decreasing a $CO_2$ concentration of a fluid, comprising the steps of:

applying a flow of $CO_2$ to a liquid comprising a salt, forming carbonic acid in solution; and mixing said carbonic acid solution in (i) with a base, whereby the pH of said mixture in (ii) is between 9-12; and solid carbonate is formed and the concentration of $CO_2$ in said fluid is decreased.

In one embodiment the carbonic acid solution of step (i) is added to the base, whereby increasing the pH of said carbonic acid solution and solid carbonate is formed. In another embodiment, the carbonic acid solution comprises carbonic acid, bicarbonate, a salt and $CO_2$. In another embodiment, the base is added to the carbonic acid solution.

In some embodiments, the $CO_2$ used in the methods, apparatuses and fluids is injected to a liquid comprising a salt at a flow rate efficient to raise the concentration of $CO_2$ in said liquid. In another embodiment, the $CO_2$ used is a mixture of gases comprising $CO_2$. In another embodiment, the gas mixture is $CO_2$ enriched air. In another embodiment, the flow rate depends on the size of the treated zone. In another embodiment, a higher flow rate reduces the yield of formation of solid carbonate according to Example 35. In another embodiment, the $CO_2$ is injected at ambient pressure. In another embodiment, 12% $CO_2$/air is used, thus the $CO_2$ partial pressure would be 0.12 atmosphere. In another embodiment, 12% $CO_2$/air is used, according to Examples 31-37. In another embodiment, the term "ambient pressure" refers to atmospheric pressure. In another embodiment, the $CO_2$ enriched air emitted is in ambient/atmospheric pressure. In another embodiment, 100% $CO_2$ is used at atmospheric pressure.

In some embodiments, the methods, apparatuses and fluids of this invention make use of a liquid comprising a salt wherein $CO_2$ is applied and/or injected thereto. In one embodiment, the concentration of said $CO_2$ in said liquid is efficient to form solid carbonate. In another embodiment, said liquid is saturated by $CO_2$.

In some embodiment, the methods, apparatuses and fluids of this invention make use of a carbonic acid. In one embodiment, said carbonic acid is formed in an aqueous solution comprising a metal salt, upon applying and/or injecting $CO_2$ to said aqueous solution. In another embodiment, said carbonic acid is formed in said aqueous solution at a pH range of 3-6. In another embodiment said carbonic acid is formed at a pH range of 3.5-5.5. In another embodiment said carbonic acid is formed at a pH range of 4-5.

In some embodiments, the $CO_2$ used in the methods, apparatuses and fluids is applied or injected to a liquid. In another embodiment, the $CO_2$ is a mixture of $CO_2$ a gas and/or liquid. In another embodiment, the mixture comprises $CO_2$ and air. In another embodiment, the mixture is an atmospheric air. In another embodiment, the mixture comprises at least 0.1% v/v of $CO_2$. In another embodiment, the mixture comprises at least 0.5% v/v of $CO_2$. In another embodiment, the mixture comprises at least 1% v/v of $CO_2$. In another embodiment, the mixture comprises at least 10% v/v of $CO_2$. In another embodiment, the mixture comprises at least 20% v/v of $CO_2$. In another embodiment, the mixture comprises at least 30% v/v of $CO_2$ In another embodiment, the mixture comprises at least 50% v/v of $CO_2$. In one embodiment, the $CO_2$ is a pure gas.

In some embodiments, the methods, apparatuses and fluids of this invention make use of a base. In one embodiment, the base comprises $NH_3$ (g), $NH_3$ (aq), NaOH, lime water, $Ca(OH)_2$, coal ash or any combination thereof. In another embodiment, lime water is freshly prepared from calcium chloride and sodium hydroxide. In another embodiment, lime water is freshly prepared from calcium chloride and sodium hydroxide according to Examples 4-8 and 16. In another embodiment, commercially available lime water is used. In another embodiment commercially available solid $Ca(OH)_2$ is used. In another embodiment, an aqueous solution of NaOH is used. In another embodiment, NaOH pellets are used. In one embodiment $NH_3$ (g) or $NH_3$ (aq) are from man-made synthetic sources of ammonia. In another embodiment $NH_3$ (g) or $NH_3$ (aq) is from domestic or wild sources of bird guano, from poultry farms or mineral deposits. In another embodiment $NH_3$ (g) or $NH_3$ (aq) is from bovine, porcine, ovine, equine urine and/or feces. In another embodiment $NH_3$ (g) or $NH_3$ (aq) is from waste water from fish farms or marine mammals. In another embodiment $NH_3$ (g) or $NH_3$ (aq) is from urine. In one embodiment, animal manure is used as a source of said base. In another embodiment, the animal manure is from pigs or chickens.

In one embodiment, the carbonic acid solution is added to a base, whereby the pH increases to pH between 8.5-12.5. In another embodiment, the pH increases to pH between 9-12. In another embodiment, the pH increases to pH between 9-11. In another embodiment, the pH increases to pH between 10-11.

In another embodiment, the carbonic acid solution is added to a base under inert atmosphere. In another embodiment, the carbonic acid solution is added under argon atmosphere.

In one embodiment, the $CO_2$, carbonic acid and bicarbonate solution is added to a base, whereby the ratio between said carbonic acid/$CO_2$/bicarbonate and base is in the range of 1:100 to 1:1 of molar ratio. In one embodiment, the ratio of said carbonic acid/$CO_2$/bicarbonate and base is in the range of 1:100 to 1:80 of molar ratio. In one embodiment, the ratio of said carbonic acid/$CO_2$/bicarbonate and base is in the range of between 1:80 to 1:60 of molar ratio. In one embodiment, the ratio of said carbonic acid/$CO_2$/bicarbonate and base is in the range of between 1:60 to 1:40 of molar ratio. In one embodiment, the ratio of said carbonic acid/$CO_2$/bicarbonate and base is in the range of between 1:40 to 1:20 of molar ratio. In one embodiment, the ratio of said carbonic acid/$CO_2$/bicarbonate and base is in the range of between 1:20 to 1:10 of molar ratio.

In another embodiment, solid carbonate is formed upon addition of the carbonic acid solution to the base. In another embodiment, precipitation of solid carbonate at least at pH 9 enhances the yield. In another embodiment, precipitation of solid carbonate at pH range of 9-12 enhances the yield. In another embodiment, precipitation of solid carbonate at least at pH 10 enhances the yield. In another embodiment, increasing the pH above pH 12.5, reduces the yield of solid carbonates and enhance the yield of solid hydroxides.

In another embodiment, metal salt and/or the base are further added subsequent to the formation of solid carbonate, thereby enhancing the yield of solid carbonate.

In some embodiments, the methods, the use of the apparatuses and fluids of this invention provide a solid carbonate. In one embodiment, the solid carbonate precipitate is further isolated. In another embodiment, isolation of the precipitate is via filtration and/or centrifugation, or combination thereof. In another embodiment, the precipitate is recovered, or in another embodiment, recycled, or in another embodiment, regenerated, or reused. In another embodiment, the filtrate is recovered, or in another embodiment, recycled, or in another embodiment, regenerated, or reused. In another embodiment, the filtrate is recycled and added to a base and/or a metal ion is added to the filtrate, to provide further precipitation of solid carbonate. In another embodiment, the filtrate is recycled and added to a base and/or a metal ion, $CO_2$, or any combination thereof are added to the filtrate, to provide further precipitation of solid carbonate.

In another embodiment, the methods, fluid and apparatuses of this invention make use of $CO_2$ gas, wherein said $CO_2$ gas, is released by a man-made process, a consequence of a natural process or a gas created as a by-product of a man-made process. In another embodiment, the methods, fluid and apparatuses make use of a $CO_2$ gas, wherein said $CO_2$ gas is released to the atmosphere, and conveyed to the fluid by ducts. In another embodiment, the methods, fluid and apparatuses make use of a $CO_2$ gas, wherein said $CO_2$ gas is conveyed from a factory exhaust system, wherein $CO_2$ is expelled, to the fluid by ducts.

In one embodiment, the term "fluid" refers to any material or substance which flows or moves. In one embodiment, the term "fluid" refers to any material or substance which is present in a semisolid, or in another embodiment, liquid, or in another embodiment, sludge, or in another embodiment, vapor, or in another embodiment, gas or in another embodiment, any other form or state, which flows or in another embodiment, moves.

Fluids of this invention, or for use in the methods and/or apparatuses of this invention comprise, inter-alia, an aqueous solution. In another embodiment, the fluids of this invention or for use in the methods and/or apparatuses of this invention comprise, inter-alia, a saline solution. In another embodiment, the fluids of this invention or for use in the methods and/or apparatuses of this invention comprise, inter-alia, an underground water reservoir. In another embodiment, the fluids of this invention or for use in the methods and/or apparatuses of this invention comprise, inter-alia, a natural body of water. In another embodiment, the fluids of this invention or for use in the methods and/or apparatuses of this invention comprise, inter-alia, effluent from a desalination plant.

In one embodiment, the term "natural body of water" may comprise a sea, effluents from desalinization plants, brackish water rich in Ca ions, a lake, an ocean, a river, or groundwater In another embodiment, the fluids of this invention or for use in the methods and/or apparatuses of this invention comprise, inter-alia, a gas. In one embodiment, the fluids of this invention or for use in the methods and/or apparatuses of this invention comprise, inter-alia, an aqueous solution injected with gas. In another embodiment the fluids of this invention or for use in the methods and/or apparatuses of this invention comprise, inter-alia, a gas dissolved in an aqueous solution. In another embodiment the fluids of this invention or for use in the methods and/or apparatuses of this invention comprise, inter-alia, a liquid. In another embodiment the fluids of this invention or for use in the methods and/or apparatuses of this invention comprise, inter-alia, an aquifer.

In one embodiment, the term "decreasing" refers to reducing. In another embodiment the term "decreasing" refers to declining, diminishing or abrogating. In one embodiment, of this invention, "decreasing a $CO_2$ concentration" refers to sequestering $CO_2$ as solid carbonates. In another embodiment, the term "decreasing a $CO_2$ concentration" refers to slowing the rise of an atmospheric $CO_2$ concentration.

In some embodiments, decreasing the $CO_2$ concentration of fluid via the methods, fluids and apparatuses of this invention, makes use of, inter-alia, the formation of solid carbonates, thereby diminishing $CO_2$.

In one embodiment, the term "atmospheric air" refers to a gas. In another embodiment, the term "atmospheric air" refers to air. In another embodiment, the term "atmospheric air" refers to a part of an atmosphere. In another embodiment, the term "atmospheric air" refers to any defined environment, for example outside of a factory producing $CO_2$ as a by-product, or within a 10 km radius of a factory producing $CO_2$ as a by-product, or rural center or an industrial area, etc.

In one embodiment the atmospheric air contains high $CO_2$ levels as a consequence of a man-made process. According to this aspect, and in one embodiment, the process comprises, inter-alia, release of $CO_2$, for example by burning of waste, plastics, polymers, hydrocarbons, carbonaceous materials, wood fuels, fossil fuels, coal, brown coal, naphtha, oil, gasoline, diesel fuels, kerosene, petroleum, liquefied petroleum gas (LPG), natural gas, bottled gas, methane, butane, propane, gasoline additives, ethanol, methanol, biodiesel, mono alkyl ester or any combination thereof.

In another embodiment, air containing high $CO_2$ levels, processed and treated at least partially via the methods, fluids and apparatuses of this invention arise from a natural biological process. In one embodiment, the process is, for example, decomposition of organic materials or as a product of farming (e.g., livestock, field burning of agricultural residuals), which generate $CO_2$ in a direct or in an indirect manner (e.g., release of methane), releasing contaminants to surrounding air supplies. For instance, methane is produced in the digestive processes of livestock. In another embodiment, animal agricultural methane emissions are released from the massive "lagoons" used to store untreated farm animal waste. In another embodiment, CO and hydrocarbons including methane are being oxidized in the atmosphere to $CO_2$. There are various sources of methane, including that produced or released by bacteria, in forests, from livestock, or from processes conducted in the oil and gas industries. In another embodiment, increased levels of $CO_2$ arise from deforestation. The fermentation of sugars and starches (catalyzed by yeast) produces ethanol and gaseous $CO_2$. In another embodiment large-scale industrial processes generate $CO_2$. In another embodiment, the large-scale industrial processes include controlled oxidation of ethylene producing ethylene oxide and carbon dioxide; neutralization of acids which exist within waste streams from industrial processing is done by using calcium carbonate (which is commonly known as limestone). $CO_2$ arises as a result of an acid-base reaction. Large quantities of by-product carbon dioxide are produced by plants which are dedicated to the manufacture of hydrogen or ammonia. These plants operate by steam reforming of natural gas, liquefied petroleum gas (LPG) or naphtha into a mixture of synthesis gas (i.e., hydrogen, carbon monoxide and carbon dioxide) and the carbon monoxide is then catalytically removed by forming additional carbon dioxide via the water-gas shift reaction. In addition, industrial processes using hydrocarbons such as acetylene are a known source of $CO_2$.

Other industrial sources include: (i) the processing of phosphate rocks, which can release carbon dioxide; (ii) combustion processes, which are used in generators to produce energy by the reaction of a hydrocarbon with oxygen.

It is to be understood that any process yielding a fluid contaminated with $CO_2$, by any means, may be carried out by the methods, fluids and apparatuses of this invention.

In one embodiment the methods, fluid and apparatuses make use of a salt, wherein said salt is a metal salt. In another embodiment the salt may comprise inter-alia, calcium ions, sodium ions, potassium ions, magnesium ions, barium ions, manganese ions, iron ions, strontium ions, zinc ions, aluminum ions, ammonium ions, cations, or any other cation that forms a solid carbonate, or any combination thereof. In another embodiment said salt is a $Ca^{2+}$ ion. In another embodiment the salt of and for use in this invention may comprise inter-alia, calcium chloride, calcium hydroxide, Red Sea Salt, $CaSO_4$, calcium oxide, magnesium hydroxide, brackish water, desalination effluents or any combinations thereof. In another embodiment the salt is a mineral. In another embodiment the mineral is a calcite, aragonite, vaterite, a gypsum, a magnesite, an olivine, a serpentine or any combination thereof. In another embodiment the salt is an inorganic salt. In another embodiment the salt is an organic salt.

In another embodiment, the concentration of said metal ion in said fluid of this invention is in the range between 0.05 M to 5 M, wherein the precipitation is enhanced upon increase in the concentration of the metal salt/ion. In another embodiment, the concentration of said metal ion in said fluid is in the range between 0.1 M to 3 M. In another embodiment, the concentration of said metal ion in said fluid is in the range between 0.1 M to 1 M. In another embodiment, the concentration of said metal ion in said fluid is in the range between 0.1 M to 2 M. In another embodiment, saturated solution of metal salts reduces the yield of solid carbonate.

In one embodiment the concentration of the salt of this invention in the fluid of this invention is <0.01% w/w. In another embodiment, the concentration of the salt in the fluid is about between 0.01-20% w/w. In another embodiment, the concentration of the salt in the fluid is about between 0.01-0.1% w/w. In another embodiment, the concentration of the salt in the fluid is about between 0.1-1% w/w. In another embodiment, the concentration of the salt in the fluid is about between 0.01-1% w/w. In another embodiment, the concentration of the salt in the fluid is about between 1-3% w/w. In another embodiment, the concentration of the salt in the fluid is about between 3-10% w/w. In another embodiment, the concentration of the salt in the fluid is about between 10-20% w/w.

In one embodiment, the choice of the salt will depend upon the solubility constant ($K_{sp}$) of the solid carbonate formed, by reacting said salt with carbon dioxide. In another embodiment, a preferable salt is a salt which yields together with carbon dioxide, a solid carbonate having low solubility constant ($K_{sp}$) in an aqueous solution. For example, a preferred salt is calcium based salt (calcium chloride, calcium hydroxide, calcium sulfate) which forms together with carbon dioxide calcium carbonate as a precipitation in aqueous solution, having low solubility constant.

In one embodiment, the methods of this invention comprise the formation of a solid carbonate precipitate layer, small particles of solid carbonate and/or the solid carbonate may form pore fillings. In another embodiment, the solid carbonate precipitate layer, small particles and/or pore fillings is an isolating layer, wherein $CO_2$ can be further injected therein below, in one embodiment, and/or the $CO_2$ can be further restored under said solid carbonate precipitate layer, small particles and/or pore fillings.

In another embodiment the term "supersaturated" refers to the aqueous solution comprising $CO_2$ at a concentration which is higher than its solubility. In another embodiment the solubility of $CO_2$ in water at room temperature is about 33 mM). The equilibrium concentration of $CO_2$ in water is a function of temperature, pressure, pH and salinity. In one embodiment, the solubility of $CO_2$ in a solution depends on the pressure of $CO_2$ in equilibrium with the solution wherein the solubility increases with increasing pressure. In another embodiment, the solubility of $CO_2$ depends on the temperature, wherein the solubility decreases with increasing temperature. In another embodiment, the solubility of $CO_2$ decreases with increasing salinity. In another embodiment, the solubility of $CO_2$ depends on the pH wherein the solubility of $CO_2$ increases with increasing pH.

In one embodiment, the term "about", refers to a deviance of between 0.0001-5% from the indicated number or range of numbers. In one embodiment, the term "about", refers to a deviance of between 1-10% from the indicated number or range of numbers. In one embodiment, the term "about", refers to a deviance of up to 25% from the indicated number or range of numbers.

In one embodiment, the terms "a" or "an" as used herein, refer to at least one, or multiples of the indicated element, which may be present in any desired order of magnitude, to suit a particular application, as will be appreciated by the skilled artisan. In one embodiment, the term "a gas" refers to two or more kinds of gases, which differ in terms of their composition. In some embodiments, the fluids, kits and methods of this invention may comprise and/or make use of multiple kinds of gases for decreasing a $CO_2$ concentration.

In one embodiment, the choice of the pressure of the gases applied, introduced or injected in this invention will depend upon the size of the reservoir above the ground, in one embodiment, or whether the gases are applied to an underground system such as an aquifer, in another embodiment.

$CO_2$ stripping is an art-recognized term, referring, in some embodiments, to removing $CO_2$, reducing or decreasing the $CO_2$ content of a fluid to an atmosphere. In some embodiments, stripped $CO_2$ can be reused in a feedback system relaying the $CO_2$ to a fluid and/or reaction chamber of this invention.

In some embodiments, the methods, fluid and apparatus may include increasing the pressure or the flow rate of the fluids introduced to enhance the rate of solid carbonate precipitation. In some embodiments, the methods, fluid and apparatus may include varying the fluid to enhance the rate of solid carbonate precipitation. In some embodiments, the methods, fluid and apparatus may include varying the size of the reaction chamber to enhance the rate of solid carbonate precipitation. In some embodiments, the methods, fluid and apparatus may include varying the pH to enhance the rate of solid carbonate. In some embodiments, the methods, fluid and apparatus may include varying the time of gas injection and/or fluids to enhance the rate of solid carbonate precipitation. In some embodiments, the methods, fluids and apparatuses may include varying the relative flow rate of the gases and/or fluids introduced to enhance the rate of solid carbonate. In one embodiment, the gases and/or fluids introduced are a gas comprising $CO_2$, air, a base in the gas phase, a basic solution, or any gas of this invention.

In some embodiments, the amount of solid carbonate precipitation may be a function of flow of the gases introduced in this invention. In another embodiment, the amount of solid carbonate precipitation is a function of the flow of the second gas, $CO_2$ gas or base. In another embodiment, the amount of solid carbonate precipitation is a function of the ratio between the flow of the first gas with respect to the flow of the second gas. In another embodiment, the amount of solid carbonate precipitation is a function of the salt concentration. In another embodiment, the amount of solid carbonate precipitation is a function of the ratio between the concentrations of salt and nucleation material. In another embodiment, the amount of solid carbonate precipitation is a function of temperature. In another embodiment, the amount of solid carbonate precipitation is a function of pH. In another embodiment, the amount of solid carbonate precipitation is a function of time. In another embodiment, the amount of solid carbonate precipitation is a function of the concentration of other compounds in the fluid It is to be understood that sequestering $CO_2$, and formation of solid carbonate and any subsequent concentration, isolation, recovery, and reuse in any subsequent application is to be considered part of this invention. Such recovery and reuse will be readily understood to one of skill in the art, and may include, for example, the application of filtration centrifugation, or placement of a semi-permeable barrier in the outlet of the water flow wherein the water is conveyed, while the solid carbonates prevented from conveyance are thereby be concentrated or isolated.

In one embodiment, $CO_2$ derivation in said carbonate can be analyzed by isotopic measurements wherein there are two stable isotopes of carbon with atomic mass numbers 12 and 13, and a radioactive isotope with atomic mass number 14. The relative amounts of any two isotopes of the same element vary because of natural differences in isotope composition of biogeochemical compounds. Because of isotopic fractionation, biogeochemical researchers can exploit measurements of isotope ratios in compounds found in various earth, ocean, and atmospheric systems to study a wide variety of processes. In another embodiment, $CO_2$ can be analyzed by gas-chromatograph mass spectra (GCMS), mass spectra (MS), and/or spectrophotometric methods such as infra red (IR).

According to this aspect and in some embodiments, derivation of $CO_2$ is detected and applied to estimate the decrease of $CO_2$ concentration. In another embodiment, the detection is applied to estimate $CO_2$ concentration in the solution prior to the introduction of the first gas. In another embodiment, the detection is applied to estimate the amount of $CO_2$ in the solid carbonate.

In some embodiments, the yield of the formation of solid carbonate is calculated based on the amount of $CO_2$ injected to the fluid of this invention. In another embodiment, the yield of the formation of the solid carbonate is calculated based on the amount of metal ions in the liquid. In another embodiment, the yield of the formation of solid carbonate based on the amount of metal ion in the liquid is calculated according to Example 30 and 33. In another embodiment, the yield of the formation of solid carbonate based on the amount of $CO_2$ injected, is calculated according to Example 32.

In one embodiment, this invention provides a method of decreasing a $CO_2$ concentration of a fluid comprising applying a flow of a first gas comprising trace amounts or no $CO_2$ and applying a flow of a second gas comprising $CO_2$ at a concentration of at least higher than that found in an air-water equilibrium to a fluid comprising;

a salt; and a liquid;

whereby solid carbonate is formed in said fluid and the concentration of said $CO_2$ in said fluid is decreased. According to this aspect, and in one embodiment, said fluid is an aquifer and further comprises rocks loaded with pores filled with or without brine. In another embodiment, $CO_2$ is stored in said pores and/or forms solids carbonate with the salts of the brine in said pores.

In one embodiment this invention provides a method of decreasing a $CO_2$ concentration of a fluid sample, comprising the steps of:

applying a flow of $CO_2$ to a liquid comprising a salt, forming carbonic acid in solution; and mixing said carbonic acid solution in (i) with a base, whereby the pH of said mixture in (ii) is between 9-12; and solid carbonate is formed and the concentration of $CO_2$ in said fluid sample is decreased.

According to this aspect, and in one embodiment, said fluid is an aquifer and further comprises rocks loaded with pores filled with or without brine. In another embodiment, $CO_2$ is stored in said pores and/or forms solids carbonate with the salts of the brine in said pores.

According to this aspect, and in one embodiment, the method results in the production of solid carbonate, bicarbonate, carbonic acid or any combination thereof as end products. In one embodiment, the solid carbonate or bicarbonate may comprise calcium, sodium, potassium, magnesium, barium, manganese, iron, strontium, zinc, ammonium or aluminum ions, or any other cation that forms a solid carbonate, or any combination thereof.

According to this aspect, and in one embodiment, the method of decreasing a $CO_2$ concentration of a fluid, results in the production of solid carbonate as precipitate, or in another embodiment production of carbonate as a suspension, or in another embodiment production of soluble carbonate, or in another embodiment production of carbonic acid, or in another embodiment production of bicarbonate, or any combination thereof. According to this aspect, and in one embodiment, the fluid is an aquifer, and $CO_2$ is further stored in porous rocks of the aquifer.

In some embodiments, the methods, fluid and apparatuses are conducted under ambient conditions. In one embodiment, the term "ambient conditions" refers to native conditions. In another embodiment such conditions refer to temperature, for example, when the desired fluids are found most typically at room temperature, then the ambient conditions present for use of the methods, fluid and apparatuses of this invention, will be conducted at room temperature. In another embodiment, the term "ambient conditions" refers to conditions wherein the fluid is found in nature, such as, arising in seas, reservoirs oceans, lakes, rivers, grounds, lands, clouds, arctic, desert, ocean floor, etc. In some embodiments, ambient conditions are approximate to that found with regard to the fluid for which applying or introducing the first gas and/or the second gas is desired, for example, fluids found in, for example, sea water, freshwater supplies, will make use of the methods, fluid and apparatuses according to the invention, at similar conditions, including salt concentration, temperature, pressure etc. as the sea water. According to this aspect, and in one embodiment, the methods, fluid and apparatus of this invention are conducted at ambient conditions approximate to that found in a sea, a reservoir, an ocean, a lake, or a river in terms of temperature, pressure, salt concentration and pH.

In one embodiment, the methods, fluid and apparatuses are conducted at room temperature. In another embodiment, the methods, fluid and apparatuses are conducted at a temperature that depends upon that found in the environment in which the method is being conducted.

In one embodiment, the methods, fluid and apparatuses make use of a material serving as a nucleation site for carbonate formation in fluid. In one embodiment, the material is a mineral or a colloidal grain. In another embodiment, the nucleation material is suspended in the water and/or embedded in a solid matrix material.

Example 2 presented herein below represents some embodiments of the methods of this invention for decreasing the $CO_2$ concentration of a fluid and sequestering $CO_2$ as a carbonate precipitate. In one embodiment, calcium carbonate was formed in the air injection regions, thus, validating use of the system of Example 2 to sequester $CO_2$ via carbonate precipitation.

Example 3 presented herein below, represents some embodiments of the methods of this invention including measuring and analyzing the solid carbonate by isotope analysis.

In one embodiment, this invention provides an apparatus for decreasing the concentration of $CO_2$ of a fluid, the apparatus comprising:

a first conveyor for the introduction of a first gas comprising trace amounts or no $CO_2$;

a second conveyor for the introduction of a second gas comprising $CO_2$ at a concentration of at least higher than that found in an air-water equilibrium; and a reaction chamber;

whereby upon adding a solution comprising a salt to said reaction chamber, introducing said first gas into said reaction chamber via said first conveyor, and introducing said second gas into said reaction chamber via said second conveyor, solid carbonate formation in said reaction chamber and evolution of unreacted gas comprising a reduced concentration of $CO_2$ occurs.

In one embodiment, this invention provides an apparatus for decreasing the concentration of $CO_2$ in a fluid sample, the apparatus comprising:

a first conveyor for the introduction a base;

a second conveyor for the introduction of a fluid sample comprising $CO_2$;

a reaction chamber; and whereby upon adding a solution comprising a salt to said reaction chamber, introducing said base into said reaction chamber via said first conveyor, and introducing said fluid sample into said reaction chamber via said second conveyor, that enables solid carbonate formation in said reaction chamber and evolution of unreacted gas occurs.

It is to be understood that any embodiment described herein, for example, with respect to the fluids, the first gas, second gas, $CO_2$ gas, base, carbonate, nucleation material, etc. will be applicable to any aspect of this invention, including methods, apparatuses or fluids and represent embodiments thereof.

In one embodiment, the apparatus of the invention comprises multiple inlets for the introduction of salt, water, the first gas and/or the second gas. In another embodiment, the apparatus of the invention optionally comprises outlets for the water, first gas and/or second gas. In some embodiments, the apparatus comprises a series of channels for the conveyance of the respective salt, water, first gas and/or the second gas to the reaction chamber. In some embodiments, the apparatus comprises a series of channels for the conveyance of the respective water, first gas and/or second gas to discharge from the apparatus. In another embodiment, the apparatus further comprises a conveyor for the release of gas from the reaction chamber. In some embodiments, such channels are constructed so as to promote contact between the introduced materials. In some embodiments, the apparatus comprises pumps to facilitate conveyance and/or contacting the materials into the reaction chamber. In some embodiments, outlets will be routed via for example ducts to convey the gas to the inlets for another round of $CO_2$ sequestering.

In one embodiment, the apparatus of the invention comprises multiple inlets for the introduction of salt, water, $CO_2$ gas and/or the base. In another embodiment, the apparatus of the invention optionally comprises outlets for the water, $CO_2$ gas, or any other unreacted gas. In some embodiments, the apparatus comprises a series of channels for the conveyance of the respective salt, water, $CO_2$ gas and/or the base to the reaction chamber. In some embodiments, the apparatus comprises a series of channels for the conveyance of the respective salt, water, $CO_2$ gas and/or the base to discharge from the apparatus. In another embodiment, the apparatus further comprises a conveyor for the release of gas from the reaction chamber. In some embodiments, such channels are constructed so as to promote contact between the introduced materials. In some embodiments, the apparatus comprises pumps to facilitate conveyance and/or contacting the materials into the reaction chamber. In some embodiments, outlets will be routed via for example ducts to convey the gas to the inlets for another round of $CO_2$ sequestering.

In some embodiments the apparatus of this invention further comprises an aqueous source. In one embodiment, the water is derived from tap water, underground water, sea water, desalinization plants, brackish water rich in Ca, ocean water, a river and/or lake.

In one embodiment, the apparatus of this invention further comprises a conveyor from the aqueous source to the reaction chamber. In another embodiment, the apparatus further comprises a conveyor from the reaction chamber to said aqueous source. In another embodiment, the apparatus further comprises a pump for circulation of water in the apparatus. In another embodiment, the apparatus further comprises a pump for circulation of water from the reaction chamber to the water source and vice versa. In another embodiment the reaction chamber comprises an aqueous source. In another embodiment, the apparatus further comprises a pump for circulation of water in the reaction chamber.

In one embodiment, the apparatus further comprises a salt source. In another embodiment, the apparatus further comprises a conveyor from said salt source to said water source.

In one embodiment, the first conveyor, second conveyor or combination thereof conveys the first gas, second gas or combination thereof to an underground water supply.

In one embodiment, the first conveyor, second conveyor or combination thereof conveys the base, $CO_2$ gas or combination thereof to an underground water supply.

In one embodiment, the apparatuses of this invention comprises a flowing system such that an aqueous solution comprising salt may be flowed through the apparatus, which may, in one embodiment, allow reaction to proceed for a prolonged period of time; thereby the process is more efficient, in terms of the percent of sequestering $CO_2$, in some embodiments, or the amount of precipitate. In some embodiments the time frame is weeks to months. In some embodiments, months to years. In another embodiment, the apparatus of this invention comprises a flowing system such that an aqueous solution comprising salt and $CO_2$, may be flowed through the apparatus, which may, in one embodiment, allow reaction with a base and thereby solid carbonate is formed in a time frame of minutes. In another embodiment, the time frame is seconds. In another embodiment, the time frame is hours. In another embodiment, the base is NaOH, lime water, or ammonia.

In another embodiment the apparatuses of this invention may comprise a stirrer. In some embodiments, the stirrer is positioned in the reaction chamber. In one embodiment the apparatus may further comprise a sonication system. In one embodiment the apparatus comprises means to apply a magnetic field to the apparatus, which in some embodiments is positioned to apply such fields in multiple orientations, which in some embodiments may move or mix magnetic particles in the reaction chamber. It will be understood by the skilled artisan that the apparatuses of this invention are, in some embodiments, designed modularly to accommodate a variety of mixing machinery or implements and are to be considered as part of this invention.

In one embodiment the first gas is conveyed to the reaction chamber, prior to entry of the second gas. In one embodiment the first gas is conveyed to the reaction chamber, prior to the solubilization of the second gas. In another embodiment the first gas is injected, to the reaction chamber.

In one embodiment the first gas is conveyed to the reaction chamber, subsequent to entry of the second gas. In one embodiment the first gas is conveyed to the reaction chamber, subsequent to the solubilization of the second gas in the fluid. In one embodiment the second gas is injected onto the fluid in the reaction chamber.

In one embodiment the first gas is conveyed to the reaction chamber, simultaneously with the second gas.

In one embodiment the $CO_2$ gas is conveyed to the reaction chamber, prior to entry of the base. In one embodiment the base is conveyed to the reaction chamber, prior to the solubilization of $CO_2$ gas in the fluid.

In some embodiments, the apparatuses of this invention comprise ports or valves through which pressure may be applied, or in other embodiments, fluids may be applied under a particular pressure. In one embodiment, the fluid introduced into the apparatus is under a 1 atm applied pressure. In one embodiment, the fluid introduced into the apparatus is under a 1-10 atm applied pressure. In one embodiment, the fluid introduced into the apparatus under a 10-20 atm applied pressure. In one embodiment, the fluid introduced into the apparatus is under a 20-30 atm pressure. In one embodiment, the fluid introduced into the apparatus is under a 30-40 atm pressure. In one embodiment, the fluid introduced into the apparatus is under a 40-50 atm pressure. In one embodiment, the fluid introduced into the apparatus is under a 50-100 atm pressure.

In another embodiment, the fluid comprising salt is introduced into the reaction chamber. In another embodiment, a fluid is first introduced into the reaction chamber and salt is further introduced to the reaction chamber. In another embodiment, a fluid comprising salt and a nucleation material is introduced into the reaction chamber. In another embodiment, the fluid comprising a salt is first introduced into the reaction chamber and a nucleation material is than introduced to the reaction chamber. In another embodiment, the fluid comprising a nucleation material is first introduced into the reaction chamber and a salt is further introduced to the reaction chamber. In another embodiment, the fluid is first introduced into the reaction chamber and salt and a nucleation material is subsequently or simultaneously introduced to the reaction chamber.

In one embodiment, such conveyance is via the presence of multiple separate chambers or channels within the apparatus, conveying individual materials to the chamber. In another embodiment, the chambers/channels are so constructed so as to allow for mixing of the components at a desired time and under specific desired conditions.

In one embodiment, the apparatuses of this invention may further include environmental control elements, which in turn control temperature, pressure, pH, or any combination thereof. In another embodiment, the apparatus further comprises at least one environmental controller. In another embodiment, the apparatus further comprises pumps for introducing fluids to the reaction chamber, under controlled pressure. In one embodiment, the apparatus of the invention may include a magnetic field source and mixer to permit magnetically-controlled fluidizing of the material applied to the apparatus. In another embodiment, the apparatus may include a mechanical stirrer, a monitor, an injection controller, a heating, a light source, an ultraviolet or an ultrasonic source, or any combination thereof.

In one embodiment, the reaction chamber is comprised of a man-made material. In another embodiment the reaction chamber is formed from natural elements, which create a boundary or compartment which is considered as a reaction chamber. In another embodiment, the reaction chamber is a reservoir. In another embodiment, the reaction chamber is an aquifer.

In one embodiment, the ducts, conveyors, pipes, valves, and ports are comprised of a man-made material. In another embodiment, man-made material includes stainless steel, metal alloys, fiber, rubber, poly-vinyl chloride (PVC), plastics, copper, Teflon, glass, concrete, aluminum, kevlar, or any combination thereof.

Figure 4:
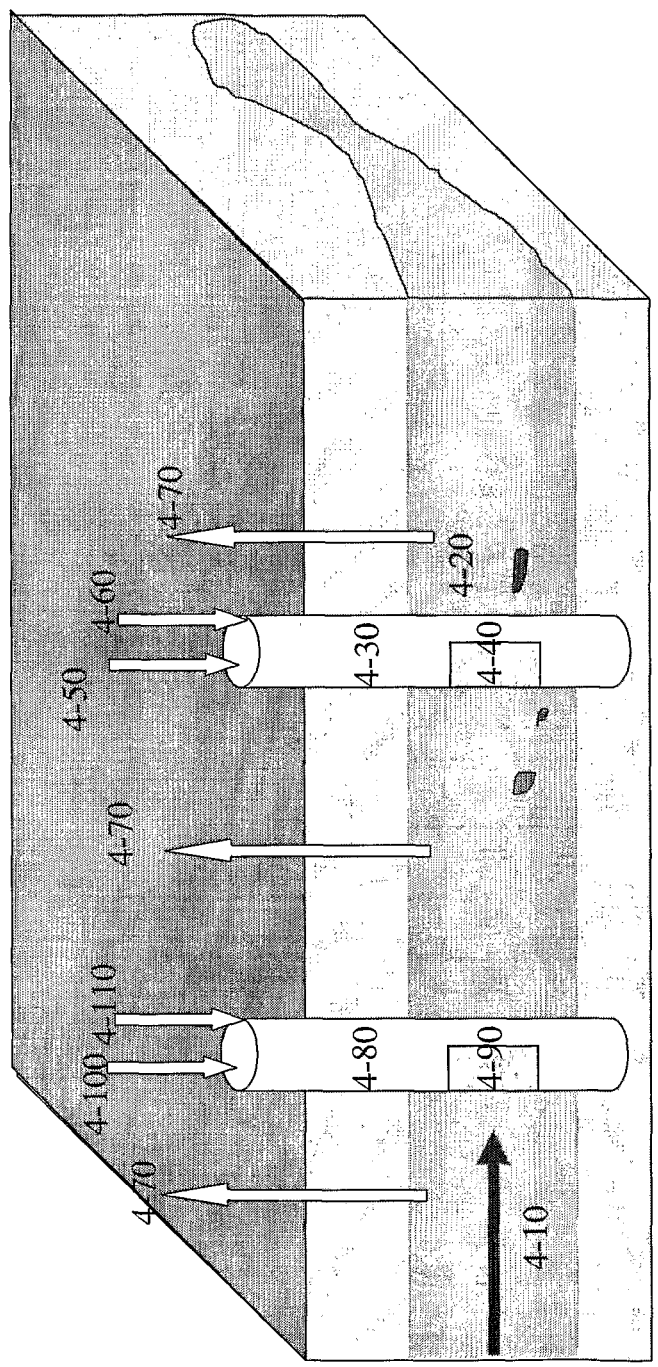
FIG. 4 is a schematic illustration of a below ground, well doublet system. Carbon dioxide (enriched, concentrated gas form, pure $CO_2$ or $CO_2$ mixed with other gases) and air (or other gas or gas mixture) are conveyed via inlets (4-100) and (4-50), respectively through injection wells (4-80) and (4-30), respectively and further screened, (4-90 and 4-40, respectively) to allow $CO_2$ and air to pass the well to for example an aquifer (4-10). The aquifer by pumping or by injection wells, or by a natural gradient, may provide ground water flow. Other inlets (4-110) and (4-60) are introduced to each well (4-80 and 4-30, respectively) for optionally adding salts (such as calcium, or magnesium salts) and/or mineral grains (or colloid) suspended in the water and/or any other solid matrix material. The excess of $CO_2$ and/or air is released via optional outlets (4-70) and may be recycled back to inlets (4-100) and (4-50), respectively. While $CO_2$ and air are introduced to the aquifer, solid carbonate is formed (4-20).

In another embodiment, the reaction chamber is an aquifer, wherein the first gas and second gas are injected therein through two separate injecting wells, followed by formation of solid carbonate and optionally the excess of gas is removed through an outlet, as depicted in FIG. 4.

In one embodiment, the apparatus of this invention comprises a conveyor which serves as a conduit for atmospheric air relay to the reaction chamber. In another embodiment, the atmospheric air comprises gas with $CO_2$ contaminants, which is released to the air as a consequence of a man-made process, or a consequence of a natural process, or the gas is formed as a by-product of a man-made process and released to the atmosphere.

In another embodiment, the apparatus of this invention comprises a conveyor which serves as a conduit for gas relay to the reaction chamber. In another embodiment, the gas comprises $CO_2$ contaminants, as a consequence of a man-made process, or created as a by-product of a man-made process and is conveyed, from a factory exhaust system, or an exhaust of a chemical plant, by a closed system to the apparatus of this invention.

In one embodiment the apparatus further comprises ducts, pipes or conveyor from a $CO_2$ source, for example, a factory exhaust system, chimneys, chemical plant, power plant, or any combination thereof to the ports of the apparatus. In another embodiment, the ducts, pipes or conveyors further comprise of shutters, valves, pressure regulators, pumps or any combination thereof.

According to this aspect, and in one embodiment, the apparatus of this invention comprises a conveyor for gas comprising $CO_2$ relay from an outlet of a chemical plant to the reaction chamber, thereby preventing contamination of the atmospheric air by $CO_2$. In another embodiment, the conveyor conduits gas in a closed system comprising pumps, ducts, channels, pipes, wells, tubes or tunnels. In another embodiment, the conveyor may further include pressure controls, which controls the pressure of the gas introduced to the reaction chamber.

In another embodiment, the apparatus of this invention comprises ducts used as outlets for excess of the first gas and/or second gas from the reaction chamber to a conveyor for another round of gas injection to the reaction chamber. In another embodiment, the conveyor is the same or different conveyor used to introduce the first gas or second gas to the fluid.

In one embodiment, the apparatus of this invention further comprises ducts, conduits, conveyors, pipes, pumps, wells, valves or any combination thereof, for gas delivery to the reaction chamber, or delivery from the reaction chamber to the environment, or recirculate the flow of the gas system. In another embodiment, ducts, conduits, conveyors, pipes, pumps, wells, valves or any combination thereof may affect the pressure, timing, rate of the gas flow.

In another embodiment, the conveyor which delivers the second gas or the $CO_2$ gas to the reaction chamber further comprises a filter positioned between the inlet and outlet of the conveyor. In another embodiment, the filter may filter small particles such as, for example dust, salt, sand, or any combination thereof, and prevent its introduction to the reaction chamber.

In some embodiments the apparatuses of this invention are located in close proximity of major $CO_2$-emitting facilities, such as power generation plants and concrete factories. In one embodiment, said facilities generate large quantities of $CO_2$ emissions, and the apparatuses of this invention have corresponding capacities to dissolve the $CO_2$ in water and to precipitate carbonate.

In one embodiment, the apparatuses of this invention are ex-situ (above ground) wherein a system with a pair of inlets for air and $CO_2$ injection are in separate inlets as depicted in FIG. 1. In another embodiment, the apparatuses of this invention are ex-situ (above ground) wherein a system with a pair of inlets for $CO_2$ injection and a basic solution are in separate inlets as depicted in FIG. 1. In another embodiment, the reservoir comprises seawater, desalination, effluents or freshwater with optionally added source of calcium. In another embodiment, the apparatus is built along the coast, or beside a lake or river. In another embodiment, water from the reservoir can flow into an adjacent reservoir where basic conditions are maintained (pH 9-12). Mixture of the two solutions of the two reservoirs leads to precipitation of calcium carbonate.

In one embodiment, the apparatuses of this invention are in-situ (below ground) wherein a well-doublet system with air and $CO_2$ injection are in separate inlets as depicted in FIG. 4. In another embodiment, the apparatuses of this invention are in-situ (below ground) wherein a well-doublet system with $CO_2$ injection and a basic solution are in separate inlets as depicted in FIG. 4. In another embodiment, the reservoir comprises seawater, desalination, effluents or freshwater with optionally added source of calcium. In another embodiment, the reservoir is built offshore or along the coast, or beside a lake or river, wherein $CO_2$ or air containing $CO_2$, possibly directly from flue gases is bubbled, to dissolve the $CO_2$. In another embodiment, water from the reservoir can flow into an adjacent reservoir where basic conditions are maintained (pH 9-12). Mixture of the two solutions of the two reservoirs leads to precipitation of calcium carbonate.

In one embodiment, this invention provides a method of decreasing the $CO_2$ concentration of a fluid, wherein said method comprises applying said fluid to an apparatus for decreasing the concentration of $CO_2$ of a fluid, the apparatus comprising:
 a first conveyor for the introduction of a first gas comprising trace amounts or no $CO_2$;
 a second conveyor for the introduction of a second gas comprising $CO_2$ at a concentration of at least higher than that found in an air-water equilibrium; and
 a reaction chamber;
 whereby upon adding a solution comprising a salt to said reaction chamber, introducing said first gas into said reaction chamber via said first conveyor, and introducing said second gas into said reaction chamber via said second conveyor, solid carbonate formation in said reaction chamber and evolution of unreacted gas comprising a reduced concentration of $CO_2$ occurs.

In one embodiment, this invention provides a method of decreasing the $CO_2$ concentration of a fluid, wherein said method comprises applying said fluid to an apparatus for decreasing the concentration of $CO_2$ in a fluid sample, the apparatus comprising:
  a first conveyor for the introduction a base;
  a second conveyor for the introduction of a fluid sample comprising $CO_2$;
  a reaction chamber; and
  whereby upon adding a solution comprising a salt to said reaction chamber, introducing said base into said reaction chamber via said first conveyor, and introducing said fluid sample into said reaction chamber via said second conveyor, that enables solid carbonate formation in said reaction chamber and evolution of unreacted gas occurs.

Some embodiments of the methods of decreasing a $CO_2$ concentration and apparatuses and fluids for affecting the same and fluids encompassed by this invention are provided herein in Example 1, where estimated 111 g of calcium carbonate was formed after 2 weeks of air and $CO_2$ injections.

Some embodiments of the methods of decreasing a $CO_2$ concentration and apparatuses and fluids for affecting the same and fluids encompassed by this invention are provided herein in Example 33, where an estimated 72.5% from total $Ca^{2+}$ in solution was precipitated as calcium carbonate, and an estimated 68.6% from total injected $CO_2$ was precipitated as carbonate. In one embodiment, estimated yield was 97.8% from total $Ca^{2+}$ in solution according to Example 30.

In one embodiment, this invention provides a fluid comprising a pressurized first gas, comprising trace amounts or no $CO_2$, a second gas comprising $CO_2$ at a concentration of at least higher than that found in an air-water equilibrium, and a salt.

In one embodiment, this invention provides a fluid comprising a base, $CO_2$ at a concentration of at least higher than that found in an air-water equilibrium, and a salt.

It is to be understood that the fluids of this invention and any embodiments described herein, with respect to the fluids will be applicable to any aspect of this invention, including methods, apparatuses and represent embodiments thereof.

One embodiment of an envisioned application of the methods, fluid and apparatuses of this invention is depicted in FIG. 1. In one embodiment, such an arrangement may be desirable for decreasing a $CO_2$ concentration using the method and/or apparatus above the ground, wherein an inflowing aqueous solution (optionally containing some dissolved $CO_2$) (1-10), optionally containing dissolved calcium, magnesium, and/or other cations is conveyed via a reservoir (1-20), which contains (optional) mineral materials that are conveyed to the reservoir via ports and act as nucleation sites to encourage carbonate precipitation. The flow conducts water out of the reservoir, and thereon water (1-30) can be recycled back into the reservoir (1-20). A gas comprising $CO_2$ at pure or high concentration or mixed with other gases is injected (1-40) to the fluid. Air, or air containing one or more additives to further raise/control the pH, or a base in a gas phase or a basic solution (1-90) and solid carbonate is formed (1-20A).

In another embodiment, the apparatus comprises an outlet to release excess gas or $CO_2$ (1-100) and released gas can be recycled back to the chamber via inlet ports (1-40) or (1-90). In some embodiments, such an arrangement may further comprise additional ports that allow introduction (or additional introduction of) of mineral grains (or colloid) suspended in the water and/or any other solid matrix material (which act as nucleation materials to encourage carbonate precipitation) (1-50) and (1-70). In some embodiments, a source of salt such as calcium or magnesium salt is introduced via ports (1-60) and (1-80). In another embodiment, such an arrangement may allow for accumulation of carbonate, within the reservoir over time. In another embodiment, such an arrangement may allow isolating the solid carbonate formed and reuse same.

One embodiment of an envisioned application of the methods, fluids and/or apparatus of this invention is depicted in FIG. 4. In one embodiment, such an arrangement may be desirable for decreasing a $CO_2$ concentration using the method and/or apparatus below the ground, wherein $CO_2$ (enriched, concentrated gas form, pure $CO_2$ or $CO_2$ mixed with other gases) and air (or other gas or gas mixture) are conveyed via inlets (4-100) and (4-50), respectively, through injection wells (4-80) and (4-30), respectively, and further via a section of well (4-90) and (4-40), respectively, and screened, to allow $CO_2$ and air to enter from the wells into an aquifer (4-10). The aquifer comprises water by natural means, by pumping or by injection wells providing ground water flow. In another embodiment, other inlets (4-110) and (4-60) are introduced to each well (4-80) and (4-30), respectively, for optionally adding salts (such as calcium, or magnesium salts) and/or mineral grains (or colloid) suspended in the water and/or any other solid matrix material. In one embodiment, excess of $CO_2$ and/or air is released via optional outlets (4-70) and may be recycled back to inlets (4-100) and (4-50), respectively. In another embodiment, while $CO_2$ and air are introduced to the aquifer, solid carbonate is formed (4-20).

In another embodiment, such an arrangement may be desirable for sequestering $CO_2$ as solid carbonate, wherein the solid carbonate remains in the aquifer.

The following examples are presented in order to more fully illustrate the preferred embodiments of the invention. They should in no way be construed, however, as limiting the broad scope of the invention.

EXAMPLES

Materials and Methods

Figure 2:
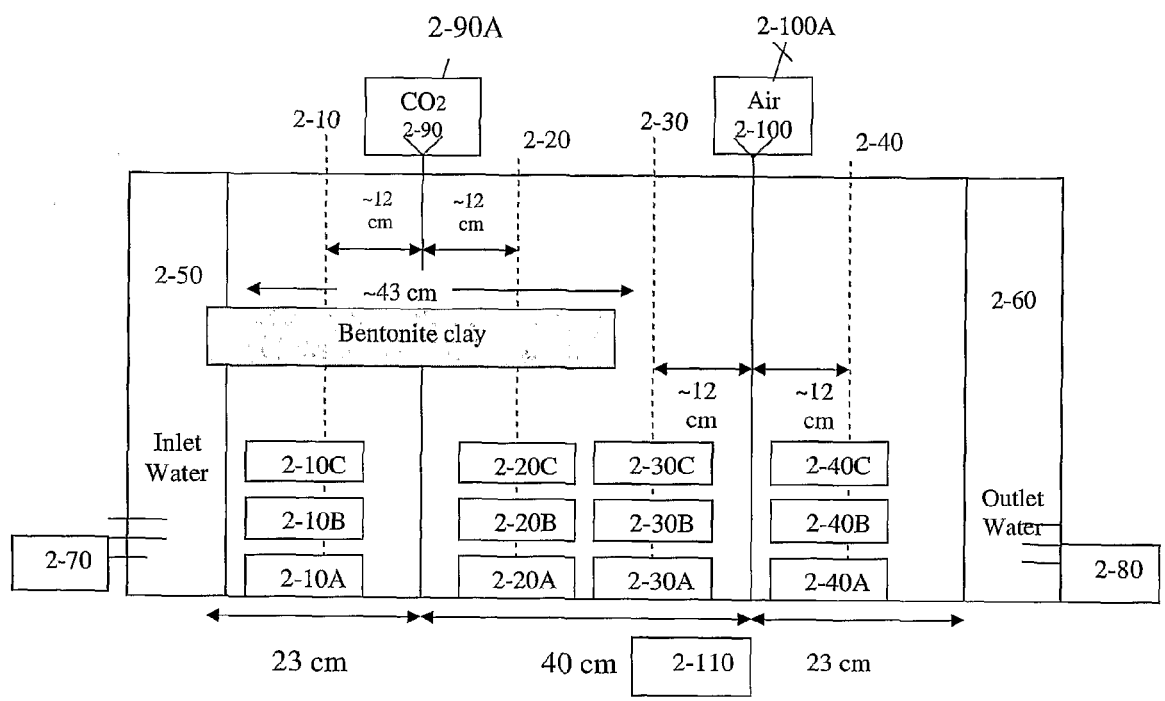
FIG. 2 is a schematic depiction of an experimental flow cell. The cell is divided into three sections: a reservoir (2-110), an inflow source (2-50) and an outflow flow (2-60) which are positioned at either end. Peristaltic pumps (2-70 and 2-80) that are operated constantly are positioned such that water is circulated. A conveyor for air (2-100) and for $CO_2$ (2-90) injections are positioned within the cell. The cell is packed with sand and optionally, partially covered with a clay cap element. Conveyors are connected to a valve controlling air (2-100A) and $CO_2$ (2-90A) flow and pressure. Four samplers are positioned in the cell (2-10, 2-20, 2-30, 2-40), to allow sampling at various regions, at differing heights depicted by A, B, or C.

Apparatus:

A flow cell was constructed which was configured as depicted in FIG. 2. The flow cell comprises 20 mm thick acrylic sheets. The internal dimensions of the flow cell were 86.5 cm length×10 cm wide×48 cm high. The cell was designed to allow flow along the length. The cell was divided into three sections: a main flow unit containing sand, and inflow and outflow water reservoirs at either end. Both inflow and outflow water reservoirs were 3.5 cm long, separated from the main cell compartment by a lattice support and fine-mesh screen with hydraulic conductivity larger than that of the sands. Different constant heads in the end reservoirs were maintained using adjustable overflow flasks. Discharge in the outflow reservoir was determined by measuring the volume of the outflow water over a given interval. Peristaltic pumps were operated constantly in each end reservoir to ensure complete mixing. A 0.5 cm (internal diameter) air injection tube and 0.5 cm (internal diameter) $CO_2$ injection tube were placed in the cell. The tubes were separated by a distance of 40 cm, and later were surrounded by sand when the cell was packed. The tubes were connected to a valve supplying air at a volumetric flow rate of 500 L/h and $CO_2$ at a volumetric flow rate of 1.5 L/h, respectively. The air and $CO_2$ flow were regulated by flow and pressure meters.

Materials:

The following was applied to the apparatus: Accusand having a mesh size of 30/40 with grain diameter of 0.532 mm and 0.35 porosity; Bentonite clay [Fisher Sci. Co.]; an aqueous solution of 4.12 mM $Cl^-$, 1.17 mM $NO_3^-$, 3.89 mM $Ca^{2+}$, 1.2 mM $Mg^{2+}$, 0.06 mM $K^+$, 0.01 mM $F^-$, 0.89 mM $SO_4^{2-}$, 2.46 mM $Na^+$, 3.69 mM $HCO_3^-$, 0.76 mM $CO_3^{2-}$ (tap water); $CO_2$ was provided by Gordon Gas [Israel].

$CO_2$ Sequestering:

The apparatus was filled with Accusand 30/40 to a total height of 36 cm, partially covered with Bentonite clay (as presented in FIG. 2), which was used in order to increase the residence time and spreading of the $CO_2$ by forcing a certain flow pathway. The clay dimensions in this embodiment were 43 cm length×4 cm wide×28-32 cm high dimensions. The flow cell was filled with tap water at a pH=7.5. The ionic composition of the tap water supplied to the inlet chamber was kept constant by using a large feed reservoir of tap water. The water flow was allowed to stabilize overnight together with the air flow, following which $CaCl_2$ was added (328 g/120 L) and $CO_2$ injection started. Air and $CO_2$ were injected for two weeks and pH measurements were conducted after 7 hours, after one week and after two weeks.

Representative water samples were analyzed determining their pH as a function of calcium carbonate formation. Samples having an acidic pH (5-6.5) are related to a higher dissolved concentration of $CO_2$, while samples having a basic pH (7.5-8) are related to the production of calcium carbonate.

Analysis of precipitated carbonate samples was conducted by isotopic analysis. $CO_2$ carries a specific isotopic signature. $CO_2$ present in the resident water is from an inorganic source with $\delta^{13}C\approx-1‰--2‰$ (although it can lie in the range +2‰--4‰), while the $CO_2$ contained in the injected air has a $\delta^{13}C\approx-7‰--8‰$. The isotopic signature for the injected $CO_2$, from an organic source, is $\delta^{13}C\approx-25‰--35‰$.

Example 1

The Flow Cell Apparatus Stimulated $CO_2$-Dependent pH Changes

Samples from different heights and locations in the flow cell (as presented in FIG. 2) were analyzed and their pH was measured. Measurements of pH serve as an indicator for $CO_2$ content. With low pH correlating to high $CO_2$ concentration. Increased promotion of carbonate precipitation occurred in a short time (minutes to hours in the flow cell), and was evident by the rise in pH (Table 1).

TABLE 1 pH samples after 7 hours, one week and two weeks.

| Sample | pH after 7 hours | pH after one week | pH after two weeks |
|---|---|---|---|
| 2-10A | — | 7.5-8 | 7.5 |
| 2-10B | 6.5 | 7.5-8 | 7.5 |
| 2-10C | 6.5 | 7.5-8 | 7.5 |
| 2-20A | 7.5 | 6 | 6-6.5 |
| 2-20B | — | 5.5-6 | 5.5 |
| 2-20C | 5.5-6 | 5-5.5 | 5-5.5 |
| 2-30A | 8 | 6-6.5 | 7 |
| 2-30B | — | — | 7.5-8 |
| 2-30C | 6 | 5.5 | 5.5 |
| 2-40A | 8.5 | 7.5-8 | 7.5 |
| 2-40B | 8.5 | 7.5-8 | 7.5 |
| 2-40C | 8.5 | 7.5-8 | 7.5 |

Table 1 indicates a trend in terms of the pH of the samples, where samples taken from the $CO_2$ injection region presented a more acidic pH, while those at the air injection region presented more basic pH.

Small changes in the flow rate may have also influenced part of the shift in pH with time.

Example 2

The Flow Cell Apparatus Stimulated $CO_2$ Sequestering

Figure 3:
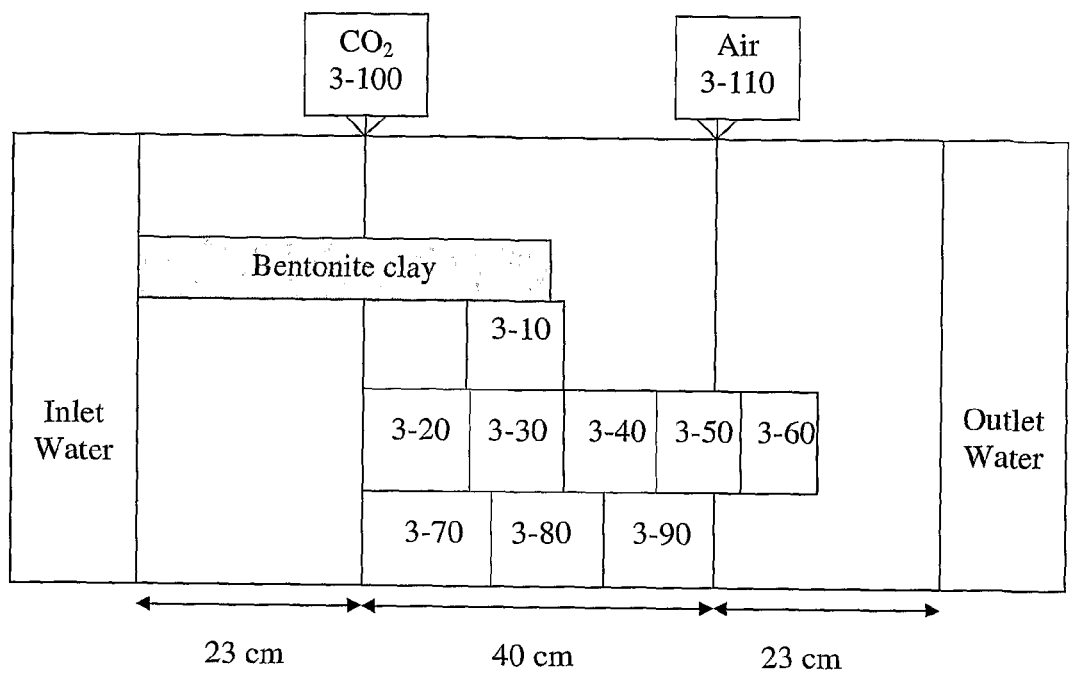
FIG. 3 is a schematic depiction of the flow cell of FIG. 2, with regions sampled highlighted in terms of their proximity to the conveyors (3-100; 3-110).

Five representative samples (sand and precipitated carbonate) were analyzed and carbonate precipitate was measured as percentage by weight of the sand sample, by dissolving deposited carbonate in acid solutions and analyzing the content of the released gases, wherein 1 g of precipitated calcium carbonate is equivalent to 0.44 g of $CO_2$. The analyzed samples were in the region between the two injection wells. The location of the samples is presented in FIG. 3.

Sample 3-20 results in ~0.2-~0.3% w/w of calcium carbonate in the sand sample; Sample 3-30 results ~0.2% w/w of calcium carbonate in the sand sample;

Sample 3-40 results ~0.4% w/w of calcium carbonate in the sand sample; Sample 3-50 results ~1.2-~1.3% w/w of calcium carbonate in the sand sample;

Sample 3-60 results ~0.4% w/w of calcium carbonate in the sand sample.

Thus samples close to the air injection (for example sample 3-50) possessed a higher concentration of calcium carbonate demonstrating formation of calcium carbonate, validating use of this system to sequester $CO_2$ via carbonate precipitation, wherein 111 g of calcium carbonate was formed after 2 weeks of air and $CO_2$ injections.

Example 3

Carbonate Precipitate Forms from Injected $CO_2$ $CO_2$ isotope signature values differ as a function of the environment in which the gas is formed. Isotope analysis of the sample regions depicted in FIG. 3 was conducted:

Sample 3-20: −19.4‰
Sample 3-30: −17.6‰
Sample 3-40: −10.5‰
Sample 3-50: −5.5‰
Sample 3-60: −9.6‰
Sample 3-10: −18.2‰
Sample 3-70: −21.1‰
Sample 3-80: −21.6‰
Sample 3-90: −4.8‰

Based on the isotopic analysis results, carbonate formation clearly arose as a function of the injected $CO_2$, as the $CO_2$ isotopic signature is affected by both the $CO_2$ contained in the injected air and the injected $CO_2$, from an organic source.

Example 4

Carbonate Precipitate from Calcium Chloride (10 g/L) and Lime Water, Collected by Centrifugation A solution of calcium chloride (500 mL, 10 g/L) was bubbled with $CO_2$ at ambient pressure, for 30 minutes. The pH was 4.0. At this time the solution was added to a saturated calcium hydroxide solution (pH=12.2) which had been previously prepared by reacting solutions of sodium hydroxide (0.1 M) and calcium chloride (0.09 M). A precipitate formed immediately. The solution was decanted and the product was collected by centrifugation. The decanted solution was pH 7.8 and dropped to 6.4 due to partitioning of $CO_2$ form the air to the solution. The solid was vacuum dried at room temperature and 0.71 grams were isolated.

In conclusion, lime water could be used to precipitate calcium carbonate.

Example 5

Carbonate Precipitate from Calcium Chloride (10 g/L) and Lime Water from $CO_2$ Scrubber, Collected by Filtration A solution of calcium chloride (500 mL, 10 g/L) was bubbled with $CO_2$ at ambient pressure for 30 minutes. The pH was 3.8. At this time the solution was added to a saturated calcium hydroxide solution (pH=12.1) which had been previously prepared by reacting solutions of sodium hydroxide (0.1 M) and calcium chloride (0.09 M), and which had been used as an air scrubber. A precipitate formed immediately. The solution was filtered and 1.11 grams were isolated. The filtrate was at pH 8.7.

In conclusion, lime water from the scrubber could be used as effectively as freshly prepared lime water.

Example 6

Carbonate Precipitate from Calcium Chloride (10 g/L), Lime Water and NaOH, Collected by Filtration A solution of calcium chloride (500 mL, 10 g/L) was bubbled with $CO_2$ at ambient pressure for 30 minutes. The pH was 3.8. At this time the solution was added to a saturated calcium hydroxide solution (pH=12.2) which had been previously prepared by reacting solutions of sodium hydroxide (0.1 M) and calcium chloride (0.09 M). A precipitate formed immediately. The solution was decanted and the product was collected by filtration through a 0.2 micron filter membrane (0.24 grams isolated). The filtrate was pH 7.8. Solid NaOH was added raising the pH to 11, causing more precipitation. An additional 1.24 grams were isolated by filtration. The total product collected was 1.48 grams.

In conclusion: addition of NaOH to the filtrate, increased the yield of the carbonate precipitate.

Example 7

Carbonate Precipitate from Calcium Chloride (10 g/L), Lime Water and NaOH Filtered under Argon A solution of calcium chloride (500 mL, 10 g/L) was bubbled with $CO_2$ at ambient pressure for 30 minutes. The pH was 3.7. The solution was added to a saturated calcium hydroxide solution (pH=12.2) which had been previously prepared by reacting solutions of NaOH (0.1 M) and $CaCl_2$ (0.09 M). A precipitate formed immediately. The solution was filtered through a 0.2 micron filter membrane (1.08 grams isolated). The filtrate, pH 7 was made alkaline, pH 10.7 with solid NaOH. An additional 1.30 grams of $CaCO_3$ was isolated by filtration under a blanket of argon gas. The pH of the filtrate was 11.0 and was stable. The total product collected was 2.38 grams.

In conclusion: the pH dropped upon exposure to $CO_2$ from the air. An argon blanket prevented the pH from dropping during filtration and increased the amount of $CaCO_3$ isolated.

As indicated here, addition of an argon blanket improved the yield dramatically; 2.38 g vs. 1.48 g (61%).

Example 8

Carbonate Precipitate from Calcium Chloride (10 g/L), Lime Water and NaOH under Argon at 20° C.

A solution of calcium chloride (500 mL, 10 g/L) was prepared and had a pH 5.7 at 20° C. Carbon dioxide was bubbled through the mixture for 45 minutes and the pH dropped to 5.3. To this solution, freshly prepared lime water (saturated calcium hydroxide, 0.2 M NaOH and 0.09 M $CaCl_2$ 500 mL, pH 12.4) was added. A precipitate formed and was collected by filtration (1.16 g were isolated). The pH of the filtrate was 7.4, and was raised to 10.4 with sodium hydroxide. A second crop of solid was obtained by filtration (additional 0.51 g were collected). The pH of the filtrate was 10.3. The total amount of solid isolated was 1.67 g.

In conclusion: the yield of the carbonate precipitate is higher at 20° C. than at lower temperature (1° C.), and is higher at higher concentrations of calcium chloride using (10 g/L) versus lower concentrations (1 g/L).

Example 9

Carbonate Precipitate from Calcium Chloride (20 g/L), Lime Water (from Pellets) and NaOH under Argon Blanket at 20° C.

A solution of calcium chloride (500 mL, 20 g/L) was prepared and had a pH 8.5 at 20° C. Carbon dioxide was bubbled through the mixture for 35 minutes and the pH dropped to 3.8. To the carbon dioxide saturated solution, a solution of lime water prepared from solid calcium hydroxide (500 mL) was added. A precipitate formed and was collected by filtration under an argon blanket (1.19 g was isolated). The pH of the filtrate was 7.0, and was raised to 10.4 by adding sodium hydroxide. A second crop of solid was obtained by filtration (additional 0.33 g was collected). The filtrate pH was 10.3. The total amount of solid isolated was 1.52 g.

In conclusion: 20 g/L calcium chloride at room temperature gave approximately the same yield of carbonate precipitates using 10 g/L calcium chloride at room temperature. Calcium hydroxide solution prepared from pellets or freshly prepared provided approximately the same yield of carbonate precipitates as well (1.52 g vs. 1.67 g, respectively).

Example 10

Carbonate Precipitate from Calcium Chloride (10 g/L), Lime Water (from Pellets) and NaOH under Argon at 20° C.

A solution of calcium chloride (500 mL, 10 g/L) was prepared and had a pH 5.8 at 20° C. Carbon dioxide was bubbled through the mixture for 100 minutes and the pH dropped to 3.9. This solution was added to lime water prepared from solid calcium hydroxide. A precipitate formed and was collected by filtration (1.00 g was isolated). The pH of the filtrate was 6.8. The pH was increased to 11.1 with sodium hydroxide to precipitate more calcium hydroxide. A second crop of solid was obtained by filtration (additional 0.44 g was collected). The filtrate pH was 11.1. The total amount of solid isolated was 1.44 g.

In conclusion: 10 g/L calcium chloride at room temperature gave approximately the same yield of carbonate precipitates using 20 g/L calcium chloride at room temperature (1.44 g vs. 1.52 g, respectively), using pellets of $Ca(OH)_2$.

Example 11

Carbonate Precipitate from Calcium Chloride (10 g/L), Lime Water (from Pellets) and NaOH added before Filtration under Argon at 20° C.

A solution of calcium chloride (500 mL, 10 g/L) was prepared and had a pH 6.8 at 20° C. Carbon dioxide was bubbled through the mixture for 100 minutes and the pH dropped to 4.2. Two mL of ca. 20% NaOH (6 M) were added followed by 500 mL of lime water solution (pH=12) prepared from solid calcium hydroxide. A precipitate formed and was collected by filtration (1.05 g was isolated). The pH of the filtrate was 6.7. The pH of the filtrate was increased to 11.1 with sodium hydroxide to precipitate more calcium carbonate. A second crop of solid was obtained by filtration (additional 0.91 g was collected). The filtrate pH was 11.0. The total amount of solid isolated was 1.96 g.

In conclusion: adding additional base prior to filtration increases the yield of $CaCO_3$.

Example 12

Carbonate Precipitate from Red Sea Salt (RSS) and Calcium Chloride (10 g/L) Using Lime Water as a Base, under Ar Red sea salt (RSS) was added to a calcium chloride solution, in order to determine whether the large amount of NaCl in sea water would prevent $CaCO_3$ precipitation since, according to the Solvay process: $2 NaCl + CaCO_3 \rightarrow Na_2CO_3 + CaCl_2$.

The red sea salt comprises the following ions based on 30 g RSS in 1 L water.

$Na^+$: 10692 ppm
$Ca^{2+}$: 380 ppm
$Mg^{2+}$: 1200 ppm
$Cl^-$: 16,811 ppm
$S^{2-}$: 785.5 ppm
alkalinity is 2.3 meq/l $[HCO_3^-]+[CO_3^{2-}]$ Red Sea Salt (15 g), was added to $CaCl_2$ solution (500 mL, 10 g/L) obtaining a solution at pH 7.8. The solid salts were not dissolved completely. $CO_2$ was bubbled through the mixture for 10 minutes and the pH dropped to 4.6. Most of the solid dissolved and no further dissolution was evident after an additional hour. The solution was decanted. To this, lime water (saturated $Ca(OH)_2$, 500 mL, pH 12.3) was added and a precipitate formed and was filtered through a 0.2 micron filter membrane, under a blanket of argon. The filtrate was pH 8.7. The solid was oven dried and 1.26 g were isolated. The filtrate pH was not raised therefore a second crop of $CaCO_3$ was not obtained.

In conclusion: Red Sea Salt was not detrimental to the carbonate precipitation.

Example 13

Carbonate Precipitate from Red Sea Salt (RSS) and Calcium Chloride (1 g/L), under Ar at 22° C.

A solution (500 mL) of Red Sea Salt (30 g/L) and calcium chloride (1.0 g/L) was prepared and had a pH 8.1. Carbon dioxide was bubbled at ambient pressure through the mixture for 30 minutes and the pH dropped to 4.7. To this solution a freshly prepared lime water solution (saturated calcium hydroxide, 0.2 M NaOH plus 0.09 M $CaCl_2$ 500 mL, pH 12.4) was added. A precipitate was formed. The mixture was kept under a blanket of argon and was filtered through a 0.2 micron filter membrane. Filtration was also done under a blanket of argon. The filtrate was pH 9.5. The solid was oven dried and 0.92 g of $CaCO_3$ were isolated.

In conclusion: lower calcium ion content lowers the yield of calcium carbonate.

Example 14

Carbonate Precipitate from Coal Ash Water and Calcium Chloride (10 g/L) Using Lime Water and NaOH as a Base under Ar at 20° C.

Undried, unsieved South African Bottom Ash (500 g) was suspended in 500 mL deionized water by placing the slurry on a rotating shaker for 15 hours. The aqueous phase was removed by filtration, and the ash cake was washed with water. The resulting filtrate was pH 12.7. Calcium chloride, 500 mL (10 g $CaCl_2$/1.0 L $H_2O$) was put in a 2000 mL graduated cylinder. Carbon dioxide was bubbled into the solution and the pH dropped to pH 3.83. Bubbling continued for 1 hour. The coal ash water (590 mL) was added to the $CO_2$ saturated calcium chloride solution and the pH of the combined solution was 5.5. No precipitate formed at this point. 500 mL lime water solution (saturated $Ca(OH)_2$) was then added forming a precipitate and raising the pH to 8.5. The alkalinity was further increased by adding 20 mL 50% NaOH (pH 12.7). The precipitate was filtered and dried yielding 2.39 g.

In conclusion: coal ash itself does not raise the pH sufficiently to precipitate calcium carbonate, however increased amounts of base ($Ca(OH)_2$ and NaOH) increased the amount of product obtained.

Example 15

Carbonate Precipitate from Coal Ash Water and Calcium Chloride (10 g/L) Using Lime Water and NaOH under Ar at 20° C.

A solution of calcium chloride, 500 mL (10 g $CaCl_2$/1.0 L $H_2O$) was put in a 2000 mL graduated cylinder. The initial pH was 4.7. Carbon dioxide was bubbled into the solution and the pH dropped to pH 3.9. Bubbling continued for 40 minutes. Lime water 500 mL, saturated $Ca(OH)_2$, pH 12.2, was then added forming a precipitate and raising the pH to 8.6. Coal ash water (650 mL, pH 12.9) as prepared in Example 14 was added to this mixture and the pH of the combined solution increased to pH 9. The alkalinity was further increased by adding 11 mL 50% NaOH (pH 12.2). The precipitate was filtered and dried resulting in 2.46 g of product.

In conclusion: the order of addition of coal ash water did not affect the amount of product isolated (2.46 g vs 2.39 g in Example 14).

Example 16

Carbonate Precipitate from Red Sea Salt (30 g/L) and Calcium Chloride (1 g/L) under Ar at 1° C.

A solution (500 mL) of Red Sea Salt (30 g/L) and calcium chloride (1.0 g/L) was prepared and had a pH 8.1. The solution was cooled with an ice/water bath to 1° C. Carbon dioxide was bubbled at ambient pressure through the mixture for 30 minutes and the pH dropped to 4.7. The solution was kept in an ice bath at 1° C. To this solution a freshly prepared lime water solution (saturated calcium hydroxide, 0.2 M NaOH plus 0.09 M $CaCl_2$ 500 mL, pH 12.4), at 20° C. was added. A precipitate was formed. The mixture was kept under a blanket of argon and was filtered through a 0.2 micron filter membrane. Filtration was also done under a blanket of argon. The filtrate was pH 7.8. The solid was oven dried and 0.09 g of $CaCO_3$ were isolated.

In conclusion: lower temperature reduced the yield of calcium carbonate (0.09 g vs. 0.92 g in Example 13).

Example 17

Carbonate Precipitate from Calcium Chloride (10 g/L) Using Lime Water and NaOH as a Base under Ar at 1° C.

A solution of calcium chloride (500 mL, 10 g/L $H_2O$; 9.09%, d=1.005 g/mL) was prepared and had a pH of 5.7 at 20° C. The solution was cooled to 5° C. and the pH rose to 5.9. Carbon dioxide was bubbled into the solution which was contained in a 1.0 L graduated cylinder. The pH dropped to 4.1 in 30 minutes and the temperature was 1° C. A solution of lime water (500 mL) was added to the calcium chloride/carbon dioxide solution. A precipitate was formed and the pH rose to 8.7. The pH started dropping therefore sodium hydroxide solution (20 mL, d 1.2 g/mL) was added. The mixture was filtered. The filtrate had a pH of 12.7. The filter cake was dried in an oven, and 4.06 g were isolated.

In conclusion: lowering the temperature reduced the yield of $CaCO_3$ obtained, however, by adjusting the pH with NaOH, the yield of carbonate precipitate was increased.

Example 18

Carbonate Precipitate from Calcium Chloride (20 g/L) Using Lime Water and NaOH as a Base under Ar at 1° C.

A solution of calcium chloride, (500 mL, 20 g/L) was put in a 1 L graduated cylinder in an ice/water bath. Initially the pH was 7.8. After 1 hour of bubbling carbon dioxide through the solution the pH was 3.8 and the temperature was <1° C. A solution of lime water (500 mL) was added and a precipitate was formed. A solution of 50% NaOH (6 mL, d=1.50 g/mL) was then added and the solution was filtered. The filtrate was ~pH 13. The solid was isolated and oven dried; 5.28 g were isolated.

In conclusion: higher concentration of calcium ions increased the yield of carbonate precipitate.

Example 19

Carbonate Precipitate from Calcium Chloride (20 g/L) Using Lime Water and NaOH (50%) as a Base, under Ar by a Semi Flow System A solution of calcium chloride (40 g in 2.0 L $H_2O$) was prepared having an initial pH of 7.5. The solution was put in an Erlenmeyer flask fitted with a stopcock at the bottom. $CO_2$ was bubbled into it for one hour forming a saturated solution, having pH 3.8. This $CO_2$ saturated, $CaCl_2$ solution was added by gravity flow to a reaction flask which was charged with 500 mL of lime water having pH 12.9. The flow rate was 2.7 mL/min for 15 minutes and was increased to 15 mL/min. The pH of the reaction flask containing the lime water and precipitated calcium carbonate was monitored with a pH electrode. The pH was adjusted to be between 10 and 11 with the dropwise addition of 50% w/w NaOH. A total of 6.0 mL NaOH was added during the course of the reaction. The mixture was filtered under a blanket of argon through Whatman 50 filter paper. The filtrate was pH 10.8. Solid $CaCO_3$ was isolated and oven dried; 6.40 g were isolated.

In conclusion: the semi-flow system using gravity flow of the carbon dioxide saturated solution was effective. The amount of calcium carbonate isolated (6.40 g/2 L) is comparable to that in Example 9 (1.52 g/0.5 L).

Example 20

Carbonate Precipitate from Calcium Chloride (20 g/L) Using Lime Water as a Base, under Ar, by a Semi Flow System A solution of calcium chloride (40 g in 2.0 L $H_2O$) was prepared. The same apparatus was used as in Example 19. Carbon dioxide was bubbled into the solution (initial pH 8.2) for two hours causing the pH to drop to 3.8. This $CO_2$ saturated $CaCl_2$ solution was added by gravity flow to a reaction flask which was charged with 500 mL of lime water, pH 12.9. The flow rate was 8.8 mL/min for 34 minutes at which time the pH was 10.4. Lime water was pumped into the reaction flask at 9 mL/min using a peristaltic pump. The rate of lime water addition was adjusted so as to maintain the pH between 10 and 11. The mixture of lime water and precipitated calcium carbonate filtered under a blanket of argon. The filtrate was pH 10.5 and had a total mass of 5299 g. A 19.1 g sample was taken to dryness and contained 0.16 g (0.835%) solids, corresponding to 44.2 grams of dissolved solid (calcium chloride and calcium hydroxide). A total of 6.31 g $CaCO_3$ (oven dried) was isolated.

In conclusion: lime water was easier to use than NaOH and gave a similar quantity of calcium carbonate.

Example 21

Carbonate Precipitate from Tap Water Using Lime Water as a Base, under Ar by a Semi Flow System Standard Rehovot (Israel) municipal tap water (2.0 L), having pH 7.2 was put in the flask and bubbled with $CO_2$. The pH dropped to 5.1 after 1 hour. This solution was added to 500 mL lime water (pH 12.5). The pH of the reaction solution was monitored continuously by keeping the pH electrode immersed in the reaction mixture. Lime water was added to the reaction mixture to keep the pH above 10. When all of the $CO_2$ saturated tap water was added, the mixture was filtered. The filtrate volume was 4910 mL having pH 11.1; 5.68 g $CaCO_3$ was isolated.

In conclusion: lime water was the main source of calcium for $CaCO_3$.

Example 22

Carbonate Precipitate from Recycled Final Filtrate of Example 21 Using Lime Water as a Base, by a Semi Flow System The filtrate from Example 21 (2.0 L, pH 10.9) was saturated with $CO_2$. The pH dropped to pH 5.0. This was added by the usual gravity flow to 500 mL lime water (pH 12.3). Additional lime water was added to keep the pH above 10, so much so that only 1150 mL of the original 2.0 L could be used. A total of 5.1 L of lime water was used. The final pH was 11.2; 4.02 g $CaCO_3$ was isolated.

In conclusion: more $CO_2$ was sequestered using the recycled filtrate water, however greater amounts of lime water were needed.

Example 23

Carbonate Precipitate from Red Sea Salt (30 g/L) Using NaOH as a Base, by a Semi Flow System

A 5.0 L flask was charged with 60.0 g of Red Sea Salt and 2.0 L of distilled water. The solution, pH 8.7 was saturated with $CO_2$ lowering the pH to 4.5. A reaction vessel was charged with NaOH (500 mL 0.01 M, pH 12.1), and the Red Sea Salt/$CO_2$ solution was gravity fed into it lowering the pH to 9. Additional 0.25 M NaOH was pumped into the reaction but precipitation did not occur until at least 500 mL of the Red Sea Salt solution had been added. The pH was maintained about 11.5. The solid which precipitated filtered slowly. It was isolated by vacuum filtration and oven dried yielding 5.98 g of product. X-ray diffraction of the product showed it to be partially crystalline and partially amorphous. It was not calcite, aragonite, vaterite, nor calcite monohydrate.

In conclusion: NaOH was used instead of lime water as the base. The source of calcium was only from the RSS, yielding carbonate precipitate.

Example 24

Carbonate Precipitate from Gypsum Using NaOH as a Base, by a Semi Flow System

A 5.0 L flask was charged with 2.0 L of distilled water containing $CaSO_4.2H_2O$ (2.0 g/L). The pH was 7.7. $CO_2$ was bubbled through the solution lowering the pH to 3.8. A reaction flask was charged with 500 mL 2.0 g/L $CaSO_4.2H_2O$ and the pH was raised to 10.1 using NaOH (0.350 mL, 0.25 M). The $CO_2$ saturated solution was gravity fed into the reaction flask and the pH was kept between 10 and 10.5 with NaOH (0.25 M). Precipitation occurred after 500 mL of the $CO_2$ saturated solution was added. The final pH was 10.3. The yield of product was very low when the reaction mixture was filtered. Therefore the pH of the filtrate was adjusted to 11.7 with NaOH causing more solid to precipitate. This solid was isolated by vacuum filtration and oven dried yielding 1.49 grams of product which was examined by x-ray diffraction obtaining crystal forms of vaterite and calcite.

In conclusion: gypsum can be used to precipitate $CO_2$ in the form of calcium carbonates.

Example 25

Carbonate Precipitate from Gypsum (2.0 g/L) and Red Sea Salt Water, Using NaOH as a Base, by a Semi Flow System

A solution of Red Sea Salt (RSS) (60 g, 2.0 L $H_2O$) with $CaSO_4.2H_2O$ (2.0 g/L) was prepared. The solution was saturated with $CO_2$. The pH dropped from 8.6 to 4.6 after 2 hours of bubbling with $CO_2$. A flask containing 500 mL of water with $CaSO_4.2H_2O$ (2.0 g/L) and 30 g/L RSS (30 g/L) was adjusted to pH 10.4 with NaOH (0.1 M). The $CO_2$ saturated solution was added by gravity flow and the pH was maintained near the final pH 10.4. The product was isolated by vacuum filtration and oven dried (3.43 g isolated).

In conclusion: higher yields of carbonate can be obtained by combining Red Sea Salt and gypsum (3.43 g vs 1.49 g in Example 24).

Example 26

Carbonate Precipitate from Recycled Filtrate of Example 25 and Red Sea Salt Water, Using NaOH as a Base, by a Semi Flow System

The filtrate from Example 25, 2.8 L was charged with 5.46 g $CaSO_4.2H_2O$. 800 mL were put into a flask and the pH was adjusted to 10.3 with 0.2 M NaOH. The other 2.0 L of the solution were saturated with $CO_2$ (pH 5.9). It was then added to the alkaline solution by gravity flow. The pH was kept between 10.0 and 10.6 with 0.2 M NaOH. Solid material was collected by filtration and oven dried yielding 5.64 g.

In conclusion: carbonate can be obtained from the reaction with recycled water, despite the higher concentration of other ions.

Example 27

Carbonate Precipitate from Recycled Filtrate of Example 26 and Red Sea Salt Water, Using NaOH as a Base, by a Semi Flow System

Filtrate from Example 26 (3.6 L) was recycled a third time to ascertain what effect if any accumulated salts would have on $CO_2$ and precipitation of carbonate. 1.6 L was put into a flask containing $CaSO_4.2H_2O$ (3.2 g). The solution was filtered to remove undissolved material and the resulting solution contained 1.3 g $CaSO_4.2H_2O$. Another flask contained 2.0 L of recycled filtrate and $CaSO_4.2H_2O$ (4.0 g) was added. This solution was saturated with $CO_2$. The pH of this solution dropped from 10.3 to 6.0 and it was then gravity fed into the alkaline solution. The pH was maintained at 10.5 using NaOH (0.2 M). The product was isolated by filtration and oven dried yielding 2.65 g.

In conclusion: carbonate can be obtained from recycled water with higher concentrations of ions. The yield of carbonate is lower, however.

Example 28

Carbonate Precipitate from Gypsum and Red Sea Salt Water, Using NaOH as a Base

A solution of Red Sea Salt, (75 g, 2.5 L of $H_2O$) and $CaSO_4.2H_2O$ (2.0 g/L) was prepared. Two liters of the solution (pH 8.8) was saturated with $CO_2$ (final pH 4.6). The other 500 mL of the $CaSO_4.2H_2O$ solution was adjusted to pH 10.3 with NaOH (1 M) and maintained at this pH as the $CO_2$ saturated solution was added. $CaCO_3$, identified as calcite by XRD, precipitated. 2.73 g were isolated.

The filtrate, 2.6 L was recycled to repeat the experiment. $CaSO_4.2H_2O$ (4.2 g) was added to 2.1 L of the recycled filtrate (pH 9.8) and was saturated with $CO_2$ (final pH 5.8). This solution was gravity fed into a flask containing 500 mL of filtrate containing 0.2 g $CaSO_4.2H_2O$ which had first been adjusted to pH 10. The pH was kept between 10.0 and 10.6 with 1 M NaOH. Solid material was collected by filtration and oven dried yielding 5.68 g.

The filtrate from the second step (2.6 L) was recycled again. A flask containing 2.1 L of the filtrate and $CaSO_4.2H_2O$ (7.9 g, pH 9.9) was saturated with $CO_2$ (pH 6.0). Another flask was charged with 0.5 L of filtrate and 0.15 g $CaSO_4.2H_2O$ (pH 9.9). The $CO_2$ saturated solution was gravity fed into the alkaline solution and the pH was maintained between 10.3 and 10.4. Solid material, identified by XRD as calcium carbonate monohydrate was collected by filtration and oven dried yielding 6.10 g.

In conclusion: carbonate in the form of calcite and calcium carbonate monohydrate can be obtained from the reaction when recycled water is used, despite the higher concentration of other ions.

Example 29

Carbonate Precipitate from Gypsum and Red Sea Salt Water Using Ammonium Hydroxide as a Base; by Air Stripping at Step 1

Step 1: Initial Solution: Solution A: A 5.0 L flask was charged with 60.0 g Red Sea Salt, 8.00 g $CaSO_4.2H_2O$ and 2.0 L of deionized water. $CO_2$ was bubbled through the solution lowering the pH from 8.5 to 4.7. Air was bubbled through this solution which caused the pH to increase to 8.1. This is Solution A.

Solution B, Another flask was charged with 500 mL of a solution containing 15 g Red Sea Salt and 1.0 g $CaSO_42H_2O$, pH 8.7. This is Solution B. Solution A was gravity fed into solution B, with stirring. $NH_4OH$ (25%, 13.4 M, d 0.91, ca. 5 mL) was also added to Solution B to maintain the pH between 10 and 11. The solid which precipitated was isolated by vacuum filtration and oven dried (1.04 g). The product had the same XRD spectrum as that in Example 23. It was poorly crystalline. It showed weak x-ray diffraction lines for aragonite and calcite and had a broad absorption corresponding to an x-ray absorption from brucite, $Mg(OH)_2$.

Step 2, First Recycling of Filtrate: Solution A': A 5.0 L flask was charged with 3.2 g $CaSO_4.2H_2O$ and 2.0 L filtrate from Step 1. $CO_2$ was bubbled through the solution lowering the pH from 10.4 to 6.0. This is Solution A'. Solution B': Another flask was charged with 500 mL filtrate from Step 1 and 0.2 g $CaSO_4.2H_2O$. The pH was 10.3. Solution A' was gravity fed into Solution B' with constant stirring. $NH_4OH$ (25%, 13.4 M, d 0.91, 65 mL) was added to the reaction mixture in order to maintain the pH between 10.2 and 10.4. The solid which precipitated was collected by filtration and oven dried (6.23 g). The filtrate was pH 10.3. X-ray diffraction identified the product as a mixture of calcite and aragonite.

Step 3, Second Recycling of Filtrate: Solution A": A 5.0 L flask was charged with 2.0 L of the filtrate from Step 2. The initial pH was 10.4. The mixture was stirred overnight but very little of the solid seemed to dissolve. Carbon dioxide was bubbled through the mixture and the pH dropped from 10.4 to 7.1. This is Solution A". Solution B": Another flask was charged with 500 mL of the filtrate from Step 2. The pH was 10.4. Solution A" was gravity fed into Solution B" with constant stirring. $NH_4OH$ (25%, d 0.91, 13.4 M, 265 mL) was added to the reaction mixture in order to maintain the pH between 10.2 and 10.4. Under these conditions, nothing precipitated. 120 g solid Red Sea Salt was added to the mixture. An insoluble solid was isolated by filtration and was re-suspended in 1.0 L de-ionized water and collected by filtration. The filter cake was re-suspended and collected a second time before oven drying. 11.65 g of insoluble solid was isolated.

In conclusion: a) The product isolated from gypsum saturated artificial seawater is the same as that isolated from artificial seawater without gypsum when excess carbon dioxide is removed. b) ammonium hydroxide allows more carbon dioxide to be trapped.

Example 30

Carbonate Precipitate from Gypsum and Red Sea Salt Water Using Ammonium Hydroxide as a Base Step 1, Initial Solution: Solution A: A 5.0 L flask was charged with 60.0 g Red Sea Salt, 8.00 g $CaSO_4.2H_2O$ and 2.0 L of deionized water. $CO_2$ was bubbled through the solution lowering the pH from 8.6 to 4.7. This is Solution A. Solution B: Another flask was charged with 500 mL of a solution containing 15 g Red Sea Salt and 1.0 g $CaSO_4.2H_2O$, and the pH was adjusted to 10.5 using $NH_4OH$ (13.4 M). This is Solution B. Solution A was added directly into Solution B by gravity flow. The tip of the feed tube was below the surface of Solution B. The pH of the reaction mixture was maintained at 10.3 but occasionally it varied between 10.2 and 10.4. 25% $NH_4OH$ (13.4 M) was pumped into the solution to maintain the pH. No substantial precipitation occurred until ca. 500 mL of Solution A was added to the reaction. The pH was very steady at 10.3. 40 mL $NH_4OH$ was used and a total of 2.82 g was isolated. The product was identified by XRD as being calcite it is speculated that there is also a small amount of cocrystallized monohydrocalcite Step 2, First Recycling of Filtrate: Solution A' A flask was charged with the entire filtrate from Step 1 (2540 mL) and additional 2.5 g $CaSO_4.2H_2O$. $CO_2$ was bubbled through the solution lowering the pH from 10.3 to 6.6. This is Solution A'. Solution B' 500 mL of a stock solution of $CaSO_4.2H_2O$, (2.0 g/L) charged with 15 g Red Sea Salt. The pH was raised to 10.4 using $NH_4OH$. Solution A' was added to solution B' by gravity feed as described above. Except for some initial fluctuation between pH 10.1 and 10.5, the pH was maintained very close to 10.3 using an additional 370 mL 25% $NH_4OH$. The precipitated solid was collected by filtration and re-suspended in deionized water, filtered again and washed with 200 mL $H_2O$ before oven drying. 7.16 g were isolated. The product was identified by XRD as calcite monohydrate.

Step 3, Second Recycling of Filtrate: It was speculated that excess of ammonium hydroxide together with carbon dioxide resulted with ammonium carbonate or bicarbonate, and that the limiting factor in precipitation was the quantity calcium ions. An aliquot of 100 mL of the filtrate (total volume 3370 mL) was mixed with 400 mL $CaSO_4.2H_2O$ solution (2.0 g/L). A precipitate formed. It was filtered and oven dried. 0.274 grams were isolated. Additional $CaSO_4.2H_2O$ solution did not cause further precipitation from this aliquot of the filtrate. Based on this measurement it is calculated that a total of 9.23 g of calcium carbonate could be precipitated from the filtrate. The product isolated was identified by XRD as being calcite.

In conclusion: use of $CaSO_4.2H_2O$ and $NH_4OH$ results in the capture of more $CO_2$ than other systems tried. In steps 1 and 2 only, the yield based on the amount of calcium present from both the gypsum and Red Sea Salt is 98%.

Calculating the yield of the carbonate participate can be calculated for example, according to the following steps:

Step 1: 8.0 g $CaSO_4.2H_2O$ (23.3% Ca)=1.86 g $Ca^{2+}$ ions
RSS in 2 L $H_2O$, 380 ppm Ca=0.76 g $Ca^{2+}$ ions
therefore, 2.62 g $Ca^{2+}$ in Solution A of Step 1
1.0 g $CaSO_4.2H_2O$ (23.3% Ca)=0.233 g $Ca^{2+}$ ions
0.5 L RSS $H_2O$, 380 ppm Ca=0.190 g $Ca^{2+}$ ions
therefore, 0.423 g $Ca^{2+}$ in solution B of Step 1
The total grams of Ca ions in Step 1 is (2.62+0.423)= 3.04 g The total moles of $Ca^{2+}$ available in Step 1 is 3.04 g/40 g/mole=0.0760 mol $Ca^{2+}$.

One mole of $CaCO_3$ can form one mole of $Ca^{2+}$; the molecular weight of $CaCO_3$ is 100 g/mol, therefore 0.0760 mol of $Ca^{2+}$ are 7.60 g of $CaCO_3$. Accordingly 7.60 g of $CaCO_3$ can be formed in Step 1.

Therefore the yield for Step 1 is (2.82 g isolated/7.60× 100)=37.1%

Step 2: The filtrate from step 1 was recycled. It had (7.60-2.82)=4.78 g of $CaCO_3$ not recovered. Given the molecular weight of 100 g/mol for $CaCO_3$, therefore 0.0478 mole $Ca^{2+}$ are in the filtrate, and given the atomic weigh of Ca (40 g/mol) therefore: (0.0478)(40)=1.91 g $Ca^{2+}$ are available in the filtrate.

2.5 g $CaSO_4.2H_2O$ (23.3% Ca) were added is Solution A', therefore an additional 0.583 g Ca ions were added.

Solution B' of Step 2 comprises 1.0 g of $CaSO_4.2H_2O$ (23.3% Ca) therefore 0.233 g $Ca^{2+}$ were available, and 0.5 L RSS in water (i.e., 380 ppm $Ca^{2+, 0.190}$ g).

The Total $Ca^{2+}$ available in Step 2 is: (1.91+0.583+0.233+0.190)=2.92 g $Ca^{2+}$ Therefore, 2.92/40=0.0730 moles $Ca^{2+}$ available to form at most 7.30 g $CaCO_3$ in Step 2.

Since 7.16 g were isolated in Step 2, therefore the yield is: (7.16 g $CaCO_3$ recovered/7.30 g possible)×100=98.1% yield.

The overall yield for the Example 30 is calculated from the calcium compounds added:

Step 1
9.0 g $CaSO_4.2H_2O$ (23.3% Ca)=2.10 g Ca ions
2.5 L RSS $H_2O$ (380 ppm)=0.95 g Ca ions
Step 2
3.5 g $CaSO_4.2H_2O$ (23.3% Ca)=0.82 g $Ca^{2+}$ ions
0.5 L RSS $H_2O$ (380 ppm)=0.19 g $Ca^{2+}$ ions Total for Step 1 and Step 2=4.06 g $Ca^{2+}$ ions available for the reaction which are 0.102 mol $Ca^{2+}$ (MW=40 g/mol) are available to obtain 10.2 g of $CaCO_3$ (MW=100 g/mol)

Since 2.82+7.16=9.98 g carbonate was isolated, in both steps, the overall yield is: (2.82+7.16)/10.2×100=97.8%.

Example 31

Carbonate Precipitate from Gypsum and Red Sea Salt Water Using Ammonium Hydroxide as a Base, and 12% $CO_2$ Step 1, Initial Solution: A solution of Red Sea Salt (30 g/L, 2 L) and $CaSO_4.2H_2O$ (2 g/L) was purged for 150 minutes with a gas stream of 12% $CO_2$/air, the average flow rate of which was 52 mL/min. This solution (pH 6.9) was gravity fed (4 L/hr; 67 mL/min) into 500 mL of a solution (pH 10.3) containing 30 g/L Red Sea Salt and 2 g/L $CaSO_4.2H_2O$. The pH was maintained at 10.3 with concentrated $NH_4OH$ during the experiment. The solid which precipitated (a mixture of calcite and aragonite) was collected by filtration and oven dried: 1.00 g isolated. Based on the amount of added calcium, from both sea water and gypsum, the yield of $CaCO_3$ is 19%. Based on the amount of $CO_2$ delivered from the gas cylinder the yield of $CaCO_3$ is 26%.

Step 2, First Recycling of Filtrate The filtrate from Step 1 (2.5 L, pH 10.3) was purged for 145 minutes with 12% $CO_2$/air the average flow rate of which was 47.0 mL/min. This solution (pH 9.8) was gravity fed into 500 mL of a solution (pH 10.3) of Red Sea Salt (30 g/L) and $CaSO_4.2H_2O$ (2 g/L). The pH was maintained at 10.3 with concentrated $NH_4OH$ during the experiment. The solid which precipitated a mixture of calcite and aragonite was collected by filtration and oven dried: 2.29 g isolated. Based on the amount of calcium added to the solution and the amount which was left in the filtrate from step 1 the yield of $CaCO_3$ is 43%. Based on the amount of $CO_2$ which was delivered from the gas cylinder, the yield of $CaCO_3$ is 67%.

Step 3, Second Recycling of Filtrate: The filtrate from Step 2 (3.0 L, pH 10.3) was equilibrated with $CaSO_4.2H_2O$ (3.0 g) for 17.3 hr while it was purged with 12% $CO_2$/air, the average flow rate of which was 45.6 mL/min. Much of the $CaSO_4.2H_2O$ did not dissolve. This solution (pH 9.1) was gravity fed into 500 mL of a solution (pH 10.3) containing Red Sea Salt (30 g/L) and $CaSO_4.2H_2O$ (2 g/L). The pH was maintained at 10.3 with concentrated $NH_4OH$ during the experiment. The solid which precipitated was collected by filtration and oven dried: 1.25 g isolated. A 500 mL portion of the filtrate (3.5 L total, pH 10.3) was added to 1.0 L $CaCl_2$ solution (10 g/L) and an additional 0.874 g was isolated. This solid was >99% calcite. Therefore, based on the entire 3.5 L, an additional 6.12 g $CaCO_3$ could have been isolated from the filtrate, and the total calculated amount of $CaCO_3$ that could have been isolated in this last step of the experiment is 7.37 g. This accounts for 31% of the $CO_2$ used in step 3.

In Conclusions:

The overall yield for steps 1 and 2, based on $CO_2$ delivered is 45%. The overall yield including step 3 is 34%.

The yield could be increased if in Step 1, the $CO_2$ was bubbled through a basic solution.

In step 2, if the $Ca^{2+}$ concentration or total amount could be raised the yield would be higher. This could be accomplished by mixing the filtrate with an equal volume of "gypsum water".

In step 3, a higher yield would be obtained if the optimal duration of the bubbling were known.

Calculating the yield of the carbonate participate can be calculated for example, according to the following steps:

Added Calcium in the forms of gypsum and sea salt
Step 1
RSS 2 L×0.380=0.760 g calcium from RSS top
gypsum 2 L×2.0 g/L×0.233=0.932 g Ca from gypsum top
RSS 0.5 L×0.380=0.190 g Ca from RSS bottom
Gypsum 0.5 L×2.0 g/L×0.233=0.233 g Ca from gypsum bottom
Total calcium added step 1=2.115 g calcium
Total moles calcium step 1: 2.115 g/40.08 g/mol=0.05277 moles calcium
Step 2
RSS 0.5 L×0.380=0.190 g Ca from RSS bottom
Gypsum 0.5 L×2.0 g/L×0.233=0.233 g Ca from gypsum bottom
Total calcium added in step 2=0.423 g calcium
Total moles calcium step 2=0.423/40.08 g/mol=0.01055 moles calcium
Step 3
Gypsum 3.0 g×0.233=0.699 g calcium top
RSS 0.5 L×0.380=0.190 g Ca from RSS bottom
Gypsum 0.5 L×2.0 g/L×0.233=0.233 g Ca from gypsum bottom
Total calcium added in step 3: 1.122 g
Total moles calcium in step 3: 1.122/40.08 g/mol=0.02799
Total moles of Calcium added in Steps 1, 2 and 3: 0.09131 moles calcium added
Yield of $CaCO_3$ based on added $Ca^{2+}$:
(1.00 g+2.29 g+1.25 g)/100)/09131×100=49.7%
Added $CO_2$ (added as a commercial mixture 12% in air)
Step 1
(52 mL/min)(150 min)(0.12)(273 K/292 K)(1 mol/22.4 L)(1 L/1000 mL)=0.03907 moles $CO_2$ Step 2

(47.0 mL/min)(145 min)(0.12)(273 K/292 K)(1 mol/22.4 L)(1 L/1000 mL)=0.03413 moles $CO_2$ Step 3

(45.6 mL/min)(60 min/h)(17.3 h)(0.12)(273 K/292 K)(1 mol/22.4 L)(1 L/1000 mL)=0.2371 moles $CO_2$.

Total mole $CO_2$: 0.03917+0.03413+0.2371=0.3104 moles $CO_2$ total

Yield based on $CO_2$ for steps 1 and 2 only: 45%.

Example 32

Carbonate Precipitate from Gypsum and Red Sea Salt Water Using Ammonium hydroxide as a Base, and 12% $CO_2$ Bubbled into Basic Solution Step 1. A solution containing of Red Sea Salt (30 g/L, 2 L) and $CaSO_4.2H_2O$ (2 g/L) was adjusted to pH 10.5 with concentrated (25%) $NH_4OH$. Nothing precipitated from the solution at this pH for more than 30 minutes, after which time some slight cloudiness occurred due to absorption of ambient $CO_2$. The solution was purged for 92 minutes with a gas stream of 12% $CO_2$/air, the average flow rate of which was 66.5 mL/min. Precipitation of carbonate began immediately and during this time the pH was maintained between 10.2 and 10.4 with concentrated $NH_4OH$. The precipitated solid (1.62 g) was isolated by filtration and oven dried.

Step 2. The clear filtrate (pH 10.3) from step 1 was purged for 150 minutes with a gas stream of 12% $CO_2$/air, the average flow rate was 68.8 mL/min. Unlike step 1, precipitation of carbonate began after the first few minutes. The pH was maintained between 10.2 and 10.4 with concentrated $NH_4OH$. The precipitated solid (1.60 g) was isolated by filtration and oven dried.

Step 3. The clear filtrate (pH 10.3) from step 2 was purged for 60 minutes with a gas stream of 12% $CO_2$/air, the average flow rate of which was 70.3 mL/min. Unlike the previous parts of this experiment, no precipitation occurred after 45 minutes. The pH was raised to 10.7 with concentrated (25%) $NH_4OH$ and precipitation occurred. The solid was collected by filtration. The filter cake crazed which was a property not found in materials formed at lower pH. Such behavior was noted in experiment 22. The filter cake was resuspended in $H_2O$ (100 mL) and filtered again to remove excess $NH_4OH$. The washed filter cake was oven dried giving 1.89 g solid. It was poorly crystalline and had some XRD characteristics of brucite $(Mg(OH)_2$.

In Conclusion:

Based on the amount of $CO_2$ which passed through the solution, the overall yield for the carbonate was 39% based on the calculations described herein below.

The material collected in the Steps 1 and 2 are different than the material collected in Step 3. If the material for the first two steps is $CaCO_3$ then the yield is 39% based on $CO_2$ and resulted in removal of the calcium.

Calculating the yield of the carbonate participate can be done for example, according to the following steps:

Added calcium in the forms of gypsum and sea salt, one time only.

RSS 2 L×0.380=0.760 g calcium from RSS gypsum 2 L×2.0 g/L×0.233=0.932 g Ca from gypsum Total calcium added step 1=1.692 g calcium Total moles calcium step 1: 1.692 g/40.08 g/mol=0.04222 moles calcium (1.62+1.60)=3.22 g $CaCO_3$ were collected in Steps 1 and 2. This is 0.0322 moles of $CaCO_3$.

Yield of $CaCO_3$ based on added $Ca^{2+}$: ((1.60 g+1.62 g)/100)/0.0422×100=76.3%.

Added $CO_2$ as a commercial gas 12% $CO_2$/88% air

Step 1:

66.5 mL/min×92 min×0.12(273 K/292 K)(1 mol/22.4 L)(1 L/1000 mL)=0.03064 moles $CO_2$, Step 2:

68.8 mL/min×150 min×0.12(273 K/292 K)(1 mol/22.4 L)(1 L/1000 mL)=0.05169 moles $CO_2$.

Total moles of $CO_2$: (0.03064+0.05169)=0.08233 moles $CO_2$

Yield based on $CO_2$=(0.0322 mol carbonate/0.08233 mol $CO_2$)×100=39.1%.

Example 33

Carbonate Precipitate from Gypsum Using Ammonium hydroxide as a Base, and 12% $CO_2$ Bubbled into Basic Solution Step 1.: A solution of $CaSO_4.2H_2O$ (2 g/L, 2 L, 0.023 moles, 0.0115 M $Ca^{2+}$) was adjusted to pH 10.3 with concentrated (25%) $NH_4OH$. The solution was purged for 80 minutes with a gas stream of 12% $CO_2$/air, the average flow rate of which was 58.9 mL/min. The solution began to become cloudy after 15 minutes. During the course of the experiment, the pH was maintained between 10.2 and 10.4 with concentrated $NH_4OH$. The precipitated solid (0.8 g) was isolated by filtration and oven dried.

Step 2. The clear filtrate (pH 10.3) from step 1 was again purged for 90 minutes with a gas stream of 12% $CO_2$/air, the average flow rate of which was 57.1 mL/min. The pH was maintained between 10.2 and 10.4 with concentrated $NH_4OH$. The precipitated solid (1.13 g) was isolated by filtration and oven dried. The pH of the filtrate was raised to 11.0, yet no substantial precipitate was formed. After 15 hours the filtrate was filtered through a 20 micron filter yielding another 0.17 g of calcium carbonate.

Step 3. 2.0 L of a solution containing 2 g/L $CaSO_4.2H_2O$ (0.023 moles, 0.0115 M $Ca^{2+}$) was added to the filtrate. The solution became turbid after 5 minutes and was filtered after 45 minutes, yielding and additional 1.28 g $CaCO_3$. The filtrate was pH 10.7.

Conclusion:

A total of 3.38 g $CaCO_3$ were isolated.

At least 69% of the $CO_2$ introduced into the system has been sequestered using solutions of gypsum and ammonia. This number can be made higher by turning off the $CO_2$ supply sooner.

More than 90% of the $Ca^{2+}$ initially added as aqueous $CaSO_4$ is precipitated as $CaCO_3$.

Higher $Ca^{2+}$ concentrations can be obtained using gypsum dissolved in seawater and result in more $CaCO_3$ being isolated, as in Experiment 31 where approximately twice as much dissolved calcium gave twice as much $CaCO_3$.

Calculating the yield of the carbonate participate can be calculated for example, according to the following steps:

Initial Solution:

(2.00 L solution)(2.00 g/L)=4.00 g $CaSO_4.2H_2O$, MW 172 g/mol 4.00 g/172 g/mol=0.0233 mol $CaSO_4.2H_2O$, therefore 0.0233 mol $Ca^{2+}$.

In Step 3, an additional 0.0233 mol $Ca^{2+}$ were added. The total moles of $Ca^{2+}$ added is 0.0466.

The amount of carbon dioxide introduced into the system.

Step 1:
a The average gas flow rate was 58.9 mL/min:
(58.9 mL/min)(80 min)=4710 mL 12% $CO_2$ from the balloon
(4710 mL)(0.12)=565 mL $CO_2$ at 19° C.
b Correct for Ideal Temperature 273 K (resulting in a lower volume)
(273 K/292 K)(565 mL)=529 mL
c The number of moles of $CO_2$
1.0 mol ideal gas/22.4 L=x moles $CO_2$/0.529 L
x=0.0236 mol $CO_2$
d Percentage $CO_2$ Captured in Step 1
0.796 $CaCO_3$/100 g/mol=0.00796 mol $CaCO_3$
0.0078/0.0236=33.7%
Step 2:
a The average gas flow rate was 57.1 mL/Min:
(57.1 mL/min)(90 min)=5140 mL 12% $CO_2$ from the balloon
(5140 mL)(0.12)=617 mL $CO_2$ at 19° C.
b Correct for Ideal Temperature 273 K (resulting in a lower volume)
(273 K/292 K)(617 mL)=577 mL
c The number of moles of $CO_2$
1.0 mol ideal gas/22.4 L=x moles $CO_2$/0.577 L
x=0.0257 mol $CO_2$
d Percentage $CO_2$ Captured in Step 1
1.130 $CaCO_3$/100 g/mol=–0.0113 moles $CaCO_3$
0.0113/0.0257=44.0%
Overall Yield: An additional 0.171 g collected overnight at pH=11.
Therefore, the total yield from Steps 1 and 2:
(0.796+1.130+0.171)=2.10 g $CaCO_3$
2.10 g/100 g/mol=0.0210 mol $CaCO_3$
0.0210 mol/(0.0493)=42.6%
In Step 3 an additional 1.282 g $CaCO_3$ were isolated.
The total moles of $CaCO_3$ is now 0.0210+0.0128=0.0338
The yield based on gypsum is 0.0338/0.0466=0.725=72.5%
Therefore the yield based on $CO_2$ is: 0.0338/0.0493=0.686=68.6%.

Example 34

Carbonate Precipitate from Gypsum and Red Sea Salt Water Using Ammonium Hydroxide as a Base and 12% $CO_2$ Bubbled into Basic Solution, and Additional Gypsum after Precipitation Step 1. A solution containing Red Sea Salt (30.00 g/L, 2.0 L) and $CaSO_4.2H_2O$ (2.00 g/L) was adjusted to pH 10.5 with concentrated (25%) $NH_4OH$. Nothing precipitated from the solution. The solution was purged for 60 minutes with a gas stream of 12% $CO_2$/air, the average flow rate of which was 54.2 mL/min. The pH was maintained between 10.2 and 10.4 with concentrated $NH_4OH$. The precipitated solid (1.07 g) was isolated by filtration and oven dried. It was shown by XRD to be >99% aragonite.

Step 2. The clear filtrate (pH 10.3) from step 1 was purged for 90 minutes with a gas stream of 12% $CO_2$/air, the average flow rate of which was 63.7 mL/min. Precipitation of carbonate did not begin immediately and only began after the first few minutes. The pH was maintained between 10.2 and 10.4 with concentrated $NH_4OH$. The precipitated solid (1.50 g) was isolated by filtration and oven dried. It was shown by XRD to be >99% aragonite.

Step 3. The clear filtrate (pH 10.3) from step 2 was purged for 90 minutes with a gas stream of 12% $CO_2$/air, the average flow rate of which was 65.1 mL/min. The pH was maintained between 10.2 and 10.4 with concentrated $NH_4OH$. A total of 50 mL of 25% $NH_4OH$ was used. The precipitated solid (0.54 g) was isolated by filtration and oven dried. It was shown by XRD to be >99% aragonite.

Step 4. 4.00 g $CaSO_4.H_2O$ was added to the filtrate from step 3. It was vigorously mixed on a rotary shaker for 20 hours and then filtered and oven dried. The solid (1.77 g) was shown by XRD to be a mixture of aragonite and calcite.

In conclusion: 3.11 g of calcium carbonate were precipitated. The percentage of calcium removed in three steps is 73%. Step 1 produced $CaCO_3$ in 66% yield based on $CO_2$ used.

Calculating the yield of the carbonate participate can be calculated for example, according to the following steps:
The amount of calcium in the solution:
From gypsum:
(2.00 L solution)(2.00 g/L)=4.00 g $CaSO_4.2H_2O$, MW 172 g/mol
4.00 g/172 g/mol=0.0233 mol $CaSO_4.2H_2O$, therefore 0.0233 mol $Ca^{2+}$
from seawater:
(2.00 L)(380 mg $Ca^{2+}$/L)(1 g/$10^3$ mg)(1 mol $Ca^{2+}$/40 g)=0.0190 mol $Ca^{2+}$
Total $Ca^{2+}$ in the solution: 0.0423 mole $Ca^{2+}$
Mole of $CO_2$ used in:
Step 1:
(54.2 mL/min)(60 min)(0.12)(273 K/292K)(1 mol/22.4 L)(1 L/1000 mL)=0.0163 mol $CO_2$
Step 2:
(63.7 mL/min)(90 min)(0.12)(273 K/292 K)(1 mol gas at STP/22.4 L)(1 L/1000 mL)=0.0287 mol $CO_2$
Step 3:
(65.1 mL/min)(90 min)(0.12)(273 K/292 K)(1 mol gas at STP/22.4 L)(1 L/1000 mL)=0.0294 mol $CO_2$
Yield based on $Ca^{2+}$:
(1.073 g+1.498 g+0.535 g)/100 g $CaCO_3$/mol)/0.0423 mol $CO_2$×100=73.4%
Yield based on $CO_2$:
Step 1: 1.073 g=0.01073 mol $CaCO_3$=0.01073 mol $CO_2$ captured
0.01073/0.0163×100=65.8%
Step 2: 1.498 g=0.01498 mol $CaCO_3$=0.01498 mol $CO_2$ captured
0.01498/0.0287×100=52.2%
Step 3: 0.535 g=0.00535 mol $CaCO_3$=0.00535 mol $CO_2$ captured
0.00535/0.0294×100=18.2%
Overall Yield Based on $CO_2$:
(0.03106 mol $CaCO_3$)/(0.0744 mol $CO_2$ used)=41.7%

Example 35

Carbonate Precipitate from Gypsum and Red Sea Salt Water Using Ammonium Hydroxide as a Base, and 12% $CO_2$ Bubbled into Basic Solution for 30 Min Intervals Step 1. A solution containing Red Sea Salt (30.00 g/L, 2.0 L) and $CaSO_4.2H_2O$ (2.00 g/L) was adjusted to pH 10.3 with concentrated (25%) $NH_4OH$. The solution was purged for 30 minutes with a gas stream of 12% $CO_2$/air, the average flow rate of which was 73.8 mL/min. Precipitation of carbonate began only after 20 minutes. The pH was maintained between 10.2 and 10.4 with 7 mL concentrated $NH_4OH$. The precipitated solid (0.414 g) was isolated by filtration and oven dried. It was shown by XRD to be a mixture of 53% aragonite and 47% calcite.

Step 2. The clear filtrate (pH 10.3) from step 1 was purged for 30 minutes with a gas stream of 12% $CO_2$/air, the average flow rate of which was 76.5 mL/min. Precipitation of carbonate began in about 9 minutes. The pH was maintained between 10.2 and 10.4 with 6 mL concentrated $NH_4OH$. The precipitated solid (0.535 g) was isolated by filtration and oven dried. It was shown by XRD to be almost pure aragonite.

Step 3. The clear filtrate (pH 10.3) from step 2 was purged for 30 minutes with a gas stream of 12% $CO_2$/air, the average flow rate of which was 77.9 mL/min. The pH was maintained between 10.2 and 10.4 with 7 mL concentrated $NH_4OH$. The precipitated solid (0.0.436 g) was isolated by filtration and oven dried. It was shown by XRD to be almost pure aragonite.

Step 4. The clear filtrate (pH 10.3) from step 3 was purged for 30 minutes with a gas stream of 12% $CO_2$/air, the average flow rate of which was 79.5 mL/min. The pH was maintained between 10.2 and 10.4 with 6 mL concentrated $NH_4OH$. The precipitated solid (0.313 g) was isolated by filtration and oven dried. It was shown by XRD to be aragonite with some calcite.

Step 5 Additional material (0.409 g) was obtained from the walls of the reaction flask after the reaction sequence was completed. It was shown by XRD to be 70% aragonite and 30% calcite.

In Conclusion:
Step 1 produced $CaCO_3$ in 37.3% yield. The mole ratio of $NH_3/CO_2$ used was 8.4.
Step 2 produced $CaCO_3$ in 46.5% yield. The mole ratio of $NH_3/CO_2$ used was 7.0.
Step 3 produced $CaCO_3$ in 37.0% yield. The mole ratio of $NH_3/CO_2$ used was 7.9.
Step 4 produced $CaCO_3$ in 26.2% yield. The mole ratio of $NH_3/CO_2$ used was 6.7.
The overall yield of $CaCO_3$ based on $CO_2$ is 45.5%.
The overall mole ratio of $NH_3/CO_2$ is 7.4.
49.8% of the $Ca^{2+}$ has been precipitated
A faster gas flow rate resulted in lower yields.

Example 36

Carbonate Precipitate from Gypsum Using Ammonium Hydroxide as a Base, and 12% $CO_2$ Bubbled into Basic Solution for 30 Min Intervals Step 1. A solution of $CaSO_4.2H_2O$ (2.0 L, 2.0 g/L) was adjusted to pH 10.3 with 0.5 mL concentrated (25%) $NH_4OH$. The solution was purged for 30 minutes with a gas stream of 12% $CO_2$/air, the average flow rate of which was 80.1 mL/min. Precipitation of carbonate began only after 20 minutes. The pH was maintained between 10.2 and 10.4 with 8 mL concentrated $NH_4OH$. The precipitated solid (0.319 g) was isolated by filtration and oven dried. It was shown by XRD to be 48% aragonite and 52% calcite.

Step 2. The clear filtrate (pH 10.3) from step 1 was purged for 30 minutes with a gas stream of 12% $CO_2$/air, the average flow rate of which was 80.4 mL/min. The pH was maintained between 10.2 and 10.4 with 11 mL concentrated $NH_4OH$. The precipitated solid (0.502 g) was isolated by filtration and oven dried. It was shown by XRD to be 86% aragonite and 14% calcite.

Step 3. The clear filtrate (pH 10.3) from step 2 was purged for 30 minutes with a gas stream of 12% $CO_2$/air, the average flow rate of which was 80.8 mL/min. The pH was maintained between 10.2 and 10.4 with 12 mL concentrated $NH_4OH$. The precipitated solid (0.526 g) was isolated by filtration and oven dried. It was shown by XRD to be almost pure aragonite.

Step 4. The clear filtrate (pH 10.3) from step 3 was purged for 30 minutes with a gas stream of 12% $CO_2$/air, the average flow rate of which was 81.1 mL/min. The pH was maintained between 10.2 and 10.4 with 16 mL concentrated $NH_4OH$. The precipitated solid (0.521 g) was isolated by filtration and oven dried. It was shown by XRD to be almost pure aragonite.

Step 5 Additional material (0.091 g) was obtained from the walls of the reaction flask after the reaction sequence was completed. It was shown by XRD to be a mixture of aragonite and calcite.

In conclusion:
Step 1 produced $CaCO_3$ in 26.5% yield. The mole ratio of $NH_3/CO_2$ used was 8.9.
Step 2 produced $CaCO_3$ in 41.5% yield. The mole ratio of $NH_3/CO_2$ used was 12.2.
Step 3 produced $CaCO_3$ in 43.3% yield. The mole ratio of $NH_3/CO_2$ used was 13.2.
Step 4 produced $CaCO_3$ in 42.7% yield. The mole ratio of $NH_3/CO_2$ used was 17.5.
The overall yield of $CaCO_3$ based on $CO_2$ used is 40.4%.
The overall mole ratio of $NH_3/CO_2$ is 13.1.
84.1% of the $Ca^{2+}$ added has been precipitated.
Fresh water containing dissolved gypsum removes less $CO_2$ from the gas stream than sea water containing a comparable amount of dissolved gypsum.
Fresh water containing dissolved gypsum requires more $NH_4OH$ to maintain pH 10.3 than sea water containing a comparable amount of dissolved gypsum.

Example 37

Carbonate Precipitate from Gypsum Using Ammonium Hydroxide as a Base, and 12% $CO_2$ Bubbled into Basic Solution (pH=9.3)

Step 1. A solution of $CaSO_4.2H_2O$ (2.0 L, 2.0 g/L) was adjusted to pH 9.3 with concentrated (25%) $NH_4OH$. The solution was purged for 60 minutes with a gas stream of 12% $CO_2$/air, the average flow rate of which was 79.5 mL/min. Precipitation of carbonate began only after 20 minutes. The pH was maintained between 9.2 and 9.4 with 2.9 mL concentrated $NH_4OH$. The precipitated solid (0.864 g) was isolated by filtration and oven dried. It was shown by XRD to be a mixture of aragonite, calcite and vaterite.

In Conclusion:
The quantity of $CaCO_3$ collected in this experiment (0.864 g) was in the experimental error, similar to the carbonate obtained in steps 1 and 2 (0.821 g) of Example 36.
The yield of $CaCO_3$, based on $CO_2$ is 36%. (The average yield of steps 1 and 2 in Example 36 was 34%).
The ratio $NH_3/CO_2=2.9$ (the ratio for Steps 1 and 2 above is 10.6).
$CO_2$ can be successfully captured at pH 9.3.

Example 38

Carbonate Precipitate from Red Sea Salt Water Using Ammonium Hydroxide as a Base, and 12% $CO_2$ Bubbled into Basic Solution A Red Sea Salt solution (4.5 L, 135.0 g RSS, 30.0 g/L, 380 ppm $Ca^{2+}$, pH 8.8) was brought to pH 9.6 using concentrated (25%, d=0.91) $NH_4OH$. $CO_2$ was bubbled through the solution at average rate of 85.3 mL/min for 120 minutes. The pH was maintained at 9.3 for 50 minutes, but no precipitation of $CaCO_3$ occurred during this time. An additional 135.0 g solid Red Sea Salt was added at this time. After all of the salt dissolved, precipitation was minimal only after 110 minutes. The pH was raised to 10.3 with $NH_4OH$ and the reaction mixture became cloudy. It was filtered through a 0.2 micron filter after bubbling $CO_2$ for a total of 120 minutes. The solid isolated was oven dried (0.739 g) and was shown by XRD to be aragonite.

In conclusion:

The yield of $CaCO_3$ is 14% based on $CO_2$. This is about ⅓ below previous experiments and may be a result of the novelty of the experimental conditions.

The yield of $CaCO_3$ is 8.6% based on the total $Ca^{2+}$ present in the solution.

The $NH_3/CO_2$ ratio is 5.5.

The concentration of $Ca^{2+}$ in sea water is not high enough to cause precipitation of $CaCO_3$ under the conditions used successfully with gypsum in Example 37. This is because the solubility product of calcium carbonate had not been exceeded under the conditions used namely, the calcium concentration in sea water is low without calcium supplementation, therefore the carbonate concentration was also low.

Increasing the concentration of all salts in sea water (including $Ca^{2+}$) by either adding solid Red Sea Salt (as in this case) or by removing water (as in reverse osmosis desalination) can cause the precipitation of $CaCO_3$ with concomitant capture of $CO_2$.

Example 39

Carbonate Precipitate from Red Sea Salt Water Using Ammonium Hydroxide as a Base, and 12% $CO_2$ Bubbled into Basic Solution A Red Sea Salt solution (4.50 L, 135.0 g, 30.0 g/L, 380 ppm $Ca^{2+}$, pH 8.8) was brought to pH 10.0 using concentrated (25%, d=0.91) $NH_4OH$. $CO_2$ was bubbled through the solution at average rate of 83.6 mL/min for 180 minutes. The pH was maintained at 10.0 for 180 minutes using concentrated ammonium hydroxide. Precipitation of $CaCO_3$ began at about 60 minutes and continued for the duration of the experiment. The solid was isolated by filtration through Whatman 1 filter paper and was oven dried (2.236 g). It was shown by XRD to be aragonite.

In conclusion:

The yield of $CaCO_3$ based on the amount of $CO_2$ used is 30%.

The yield of $CaCO_3$ based on available $Ca^{2+}$ is 52%.

The $NH_3/CO_2$ ratio is 3.2.

The concentration of $Ca^{2+}$ in sea water is sufficient to precipitate $CaCO_3$ if the $CO_3^{2-}$ concentration can be raised.

Extended bubbling of $CO_2$ in the presence of $NH_3$ (aq) will increase the level of $CO_3^{2-}$ available for formation of $CaCO_3$.

What is claimed is:

1. A method of decreasing a $CO_2$ concentration of a fluid, the method comprising applying a flow of a first gas comprising trace amounts or no $CO_2$, and applying a second gas comprising $CO_2$ at a concentration of at least 0.1% v/v to fluid comprising;
   a salt; and
   a liquid;
   wherein said liquid is an aqueous solution; said first gas is air, nitrogen, argon, oxygen, CO, $NO_x$, $SO_x$, methane or any combination thereof; said trace amounts of $CO_2$ is 0-0.04% v/v; and whereby solid carbonate is formed in said fluid and the concentration of said $CO_2$ in said fluid is decreased.

2. The method of claim 1, wherein said first gas is air.

3. The method of claim 1, wherein said liquid is a natural body of water, wherein said natural body of water is a sea, brackish water, underground water reservoir, lake, river or an ocean.

4. The method of claim 1, wherein said fluid is at a basic pH.

5. The method of claim 4, wherein said pH in the region within 0.1-100 m of the introduction of the first gas is between 9-12.

6. The method of claim 1, wherein said liquid comprises effluent from a desalination plant.

7. The method of claim 1, wherein said second gas is an atmospheric air contaminated as a consequence of a man-made process or as a consequence of a natural process.

8. The method of claim 7, wherein said man-made process comprises burning of waste, plastics, polymers, hydrocarbons, carbonaceous materials, wood fossil fuels, coal, brown coal, naphtha, oil, gasoline, diesel fuels, kerosene, petroleum, liquefied petroleum gas (LPG), natural gas, bottled gas, methane, butane, propane, gasoline additives, ethanol, methanol, biodiesel, mono alkyl ester or combination thereof.

9. The method of claim 1, wherein second gas further comprises sulfur oxides whereby solid carbonate and solid sulfate are formed.

10. The method of claim 1, wherein said fluid further comprises sulfur oxides whereby solid sulfate and solid carbonate are formed.

11. The method of claim 1, wherein said first gas is applied prior to solubilization of said second gas.

12. The method of claim 1, wherein said first gas is applied subsequent to solubilization of said second gas.

13. The method of claim 1, wherein said salt comprises calcium ions, sodium ions, potassium ions, magnesium ions, barium ions, manganese ions, iron ions, strontium ions, zinc ions, aluminum ions, or any combination thereof.

14. The method of claim 1, wherein said second gas consists of pure $CO_2$.

15. The method of claim 1, wherein said fluid is a supersaturated aqueous solution of said $CO_2$.

16. A method of decreasing a $CO_2$ concentration of a fluid sample, consisting essentially of:
   a. obtaining an aqueous solution of a calcium salt in basic conditions;
   b. applying a flow of $CO_2$ to said aqueous solution;
   c. forming a precipitate of solid calcium carbonate, while decreasing the concentration of $CO_2$ in said fluid sample;
   d. maintaining said basic conditions to allow continuous precipitation of said calcium carbonate;
   wherein said calcium salt is calcium chloride, calcium hydroxide, $CaSO_4$, or any combinations thereof.

17. The method of claim 16, wherein said flow of said $CO_2$ is at an ambient pressure.

18. The method of claim 16, wherein said basic conditions comprise the addition of a base, and said base comprises $NH_3$, $NH_4OH$, NaOH or lime water or any combination thereof.

19. The method of claim 18, wherein said $NH_3$ or $NH_4OH$ are from man-made synthetic sources of ammonia, domestic or wild sources of bird guano, poultry farms, mineral deposits, bovine, porcine, ovine, equine urine or feces, fish farms, marine mammals, animal urine or animal manure or any combination thereof.

20. The method of claim 16, wherein said aqueous solution is formed with a natural body of water, wherein said natural body of water is a sea, brackish water, underground water reservoir, lake, river or an ocean.

21. The method of claim 16, wherein said aqueous solution is an effluent from a desalination plant.

22. The method of claim 16, wherein said flow of $CO_2$ is an atmospheric air contaminated as a consequence of a man-made process or as a consequence of a natural process.

23. The method of claim 22, wherein said man-made process comprises burning of waste, plastics, polymers, hydrocarbons, carbonaceous materials, wood fossil fuels, coal, brown coal, naphtha, oil, gasoline, diesel fuels, kerosene, petroleum, liquefied petroleum gas (LPG), natural gas, bottled gas, methane, butane, propane, gasoline additives, ethanol, methanol, biodiesel, mono alkyl ester or combination thereof.

24. The method of claim 16, wherein said flow of $CO_2$ consists of pure $CO_2$.

25. The method of claim 16, wherein said fluid is a supersaturated aqueous solution of said $CO_2$.

26. The method of claim 16, wherein said flow of $CO_2$ is a mixture of gases comprising $CO_2$.

27. The method of claim 26, wherein said mixture of gases is $CO_2$ enriched air.

28. A method of decreasing a $CO_2$ concentration of a fluid sample, consisting essentially of:
   a. obtaining an aqueous solution of a calcium salt in basic conditions;
   b. applying a flow of $CO_2$ to said aqueous solution;
   c. adding additional said calcium salt to said mixture in step (b);
   d. forming a precipitate of solid calcium carbonate, while decreasing the concentration of $CO_2$ in said fluid sample;
   e. maintaining said basic conditions to allow continuous precipitation of said calcium carbonate;
   wherein said calcium salt is calcium chloride, calcium hydroxide, $CaSO_4$, or any combinations thereof.

29. A method of decreasing a $CO_2$, concentration of a fluid sample, consisting essentially of:
   a. obtaining an aqueous solution of a calcium salt in basic conditions;
   b. applying a flow of $CO_2$ and sulfur oxides to said aqueous solution;
   c. forming a precipitate of solid calcium carbonate and solid sulfate, while decreasing the concentration of $CO_2$ in said fluid sample;
   d. maintaining said basic conditions to allow continuous precipitation of said calcium carbonate;
   wherein said calcium salt is calcium chloride, calcium hydroxide, $CaSO_4$, or any combinations thereof.

30. A method of decreasing a $CO_2$ concentration of a fluid sample, consisting essentially of:
   a. obtaining an aqueous solution of a calcium salt and sulfur oxides basic conditions;
   b. applying a flow of $CO_2$ to said aqueous solution;
   c. forming a precipitate of solid calcium carbonate and solid sulfate, while decreasing the concentration of $CO_2$ in said fluid sample;
   d. maintaining said basic conditions to allow continuous precipitation of said calcium carbonate;
   wherein said calcium salt is calcium chloride, calcium hydroxide, $CaSO_4$, or any combinations thereof.

31. A method of decreasing a $CO_2$ concentration of a fluid sample, consisting essentially of:
   a. obtaining an aqueous solution of a calcium salt and sodium ions, potassium ions, magnesium ions, barium ions, manganese ions, iron ions, strontium ions, zinc ions, aluminum ions, or any combination thereof in basic conditions;
   b. applying a flow of $CO_2$ to said aqueous solution;
   c. forming a precipitate of solid calcium carbonate and solid sulfate, while decreasing the concentration of $CO_2$ in said fluid sample;
   d. maintaining said basic conditions to allow continuous precipitation of said calcium carbonate;
   wherein said calcium salt is calcium chloride, calcium hydroxide, $CaSO_4$, or any combinations thereof.

32. A method of decreasing a $CO_2$ concentration of a fluid sample, consisting essentially of:
   a. obtaining an aqueous solution of a calcium salt in basic conditions, wherein the pH of said aqueous solution is between 9-12;
   b. applying a flow of $CO_2$ to said aqueous solution;
   c. forming a precipitate of solid calcium carbonate, while decreasing the concentration of $CO_2$ in said fluid sample;
   d. maintaining said basic conditions to allow continuous precipitation of said calcium carbonate;
   whereby said pH enhances the yield of solid calcium carbonate precipitation, and whereby said calcium salt is calcium chloride, calcium hydroxide, $CaSO_4$, or any combinations thereof.

33. The method of claim 32, wherein said flow of $CO_2$ is a mixture of gases.

34. The method of claim 33, wherein said mixture of gases is $CO_2$ enriched air.

35. A method of decreasing a $CO_2$ concentration of a fluid sample, consisting essentially of:
   a. obtaining an aqueous solution of a calcium salt in basic conditions, wherein the pH of said aqueous solution is at least at pH 10;
   b. applying a flow of $CO_2$ to said aqueous solution;
   c. forming a precipitate of solid calcium carbonate, while decreasing the concentration of $CO_2$ in said fluid sample;
   d. maintaining said basic conditions to allow continuous precipitation of said calcium carbonate;
   whereby said pH enhances the yield of solid calcium carbonate precipitation, and wherein said calcium salt is calcium chloride, calcium hydroxide, $CaSO_4$, or any combinations thereof.

36. The method of claim 35, wherein said flow of $CO_2$ is a mixture of gases.

37. The method of claim 36, wherein said mixture of gases is $CO_2$ enriched air.

\* \* \* \* \*